US010168092B2

(12) United States Patent
Tanaka et al.

(10) Patent No.: US 10,168,092 B2
(45) Date of Patent: Jan. 1, 2019

(54) REFRIGERATION DEVICE FOR CONTAINER

(71) Applicant: DAIKIN INDUSTRIES, LTD., Osaka-shi, Osaka (JP)

(72) Inventors: Naohiro Tanaka, Osaka (JP); Noritaka Kamei, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 70 days.

(21) Appl. No.: 15/125,745

(22) PCT Filed: Feb. 27, 2015

(86) PCT No.: PCT/JP2015/001070
§ 371 (c)(1),
(2) Date: Sep. 13, 2016

(87) PCT Pub. No.: WO2015/151400
PCT Pub. Date: Oct. 8, 2015

(65) Prior Publication Data
US 2016/0377338 A1 Dec. 29, 2016

(30) Foreign Application Priority Data

Mar. 31, 2014 (JP) ................................. 2014-072267

(51) Int. Cl.
F25D 17/04 (2006.01)
A23L 3/3418 (2006.01)
(Continued)

(52) U.S. Cl.
CPC ............ *F25D 17/042* (2013.01); *A23L 3/001* (2013.01); *A23L 3/3418* (2013.01); *A23L 3/36* (2013.01);
(Continued)

(58) Field of Classification Search
CPC .... F25D 17/042; F25D 11/003; A23L 3/3418; A23L 3/3445; A23L 3/36; F24F 3/12; F24F 3/16; F24F 2003/1692; A23V 2002/00
(Continued)

(56) References Cited

U.S. PATENT DOCUMENTS 5,438,841 A * 8/1995 Cahill-O'Brien ..... A23L 3/3418
426/418
5,457,963 A 10/1995 Cahill-O'Brien et al.
(Continued)

FOREIGN PATENT DOCUMENTS

CN 1118759 A 3/1996
CN 1119612 A 4/1996
(Continued)

Primary Examiner — Marc Norman
(74) Attorney, Agent, or Firm — Birch, Stewart, Kolasch & Birch, LLP

(57) ABSTRACT

Disclosed herein is a container refrigeration apparatus (10) for cooling air in a container (11). The container refrigeration apparatus (10) includes: a gas supply device (30) which produces nitrogen-enriched air having a higher nitrogen concentration than outside air and supplies the nitrogen-enriched air into the container (11) via a supply passage (44); an oxygen concentration sensor (51) which measures an oxygen concentration of the air in the container (11); and a controller which controls the operation of the gas supply device (30) so that the oxygen concentration measured by the oxygen concentration sensor (51) reaches a target concentration. The container refrigeration apparatus (10) is provided with a measurement passage (88) which guides part of the nitrogen-enriched air passing through the supply passage (44) to the oxygen concentration sensor (51), and an on-off valve (82) is provided for the measurement passage (88).

3 Claims, 12 Drawing Sheets

(51) Int. Cl.
*F25D 11/00* (2006.01)
*A23L 3/36* (2006.01)
*A23L 3/00* (2006.01)

(52) U.S. Cl.
CPC ........ *F25D 11/003* (2013.01); *A23V 2002/00* (2013.01)

(58) Field of Classification Search
USPC ................................................ 62/78; 422/40
See application file for complete search history.

(56) References Cited

U.S. PATENT DOCUMENTS

| 5,515,693 A | 5/1996 | Cahill-O'Brien et al. |
| 2013/0019961 A1* | 1/2013 | Rogers ................. F24F 11/0009 137/334 |

FOREIGN PATENT DOCUMENTS

| CN | 1119615 | A | 4/1996 |
| EP | 0692199 | A2 | 1/1996 |
| EP | 3045844 | A1 | 7/2016 |
| EP | 3054244 | A1 | 8/2016 |
| EP | 3196572 | A1 | 7/2017 |
| JP | 8-166 | A | 1/1996 |
| JP | 2635534 | B2 | 7/1997 |

\* cited by examiner

REFRIGERATION DEVICE FOR CONTAINER

TECHNICAL FIELD

The present invention relates to a container refrigeration apparatus including a gas supply device which produces, and supplies into a container, nitrogen-enriched air, and controlling the oxygen concentration of the air in the container.

BACKGROUND ART

Container refrigeration apparatuses including a refrigerant circuit performing a refrigerant cycle have been used to cool air in a container for use in, e.g., marine transportation (see, e.g., Patent Document 1). The container is loaded with plants such as bananas and avocados. Plants perform respiration by absorbing oxygen in the air and releasing carbon dioxide even after they are harvested. The plants lose their nourishment and moisture stored in them as they respire. Thus, if the respiration rate of the plants increases, the degree of freshness of the plants decreases significantly. On the other hand, if the oxygen concentration of the air in the container decreases to a predetermined concentration as a result of the plant respiration, the respiration rate of the plants decreases. However, since it takes more time to reach such a predetermined concentration only through the respiration of the plants, the plants will be discolored, rotten in the meantime to have a decreased degree of freshness.

Patent Document 1 discloses a refrigeration apparatus in which the oxygen concentration of the air in a container is quickly reduced by separating nitrogen from the air with a membrane separator to produce nitrogen-enriched air, and supplying such nitrogen-enriched air into the container. As can be seen, if the oxygen concentration of the air in the container is set to be lower than that of the outside air, the respiration rate of the plants may be reduced so much that the degree of freshness can be maintained more easily.

CITATION LIST

Patent Document

[Patent Document 1] Japanese Patent No. 2635534

SUMMARY OF THE INVENTION

Technical Problem

The above-described container refrigeration apparatus does not include a means for measuring the nitrogen concentration of the nitrogen-enriched air to be supplied into the container. Thus, even if a gas supply device which supplies the nitrogen-enriched air into the container malfunctions and can no longer produce the desired nitrogen-enriched air, it is difficult to detect such a malfunction directly. As a result, if the oxygen concentration of the air in the container cannot be controlled to a desired level, it cannot be determined whether such control error is caused by the malfunction of the gas supply device or poor airtightness of the container cannot be determined. Simply providing a nitrogen concentration sensor for the gas supply device to address such a problem results in another problem, namely, an increase in manufacturing cost of the gas supply device.

In view of the foregoing, the present invention relates to a container refrigeration apparatus including a gas supply device which produces, and supplies into a container, nitrogen-enriched air, and controlling the oxygen concentration of the air in the container, and an object of the present invention is to make it possible to detect malfunctions of the gas supply device without an increase in manufacturing costs.

Solution to the Problem

A first aspect of the invention is directed to a container refrigeration apparatus having a refrigerant circuit (20) where a refrigerant circulates to perform a refrigeration cycle, the refrigerant circuit (20) being provided in a container (11). The container refrigeration apparatus allows heat exchange in an evaporator (24) connected to the refrigerant circuit (20) between air in the container (11) and the refrigerant to cool the air. The container refrigeration apparatus includes: a gas supply device (30) which produces nitrogen-enriched air having a higher nitrogen concentration than outside air and supplies the nitrogen-enriched air to the interior of the container (11) via a supply passage (44); an oxygen concentration sensor (51) which measures an oxygen concentration of the air in the container (11); a controller (55) which controls the operation of the gas supply device (30) so that the oxygen concentration measured by the oxygen concentration sensor (51) reaches a target concentration; a measurement passage (88) which guides part of the nitrogen-enriched air passing through the supply passage (44) to the oxygen concentration sensor (51) so that the oxygen concentration sensor (51) measures the oxygen concentration of the nitrogen-enriched air; and an on-off valve (82) provided for the measurement passage (88).

According to the first aspect of the invention, the refrigerant circuit (20) performs the refrigeration cycle to cool the air in the container (11). Further, the controller (55) controls the operation of the gas supply device (30) so that nitrogen-enriched air with a higher nitrogen concentration than outside air is produced in the gas supply device (30), and guided into the container (11) via the supply passage (44). This lowers the oxygen concentration of the air in the container (11), and soon the oxygen concentration of the air in the container is controlled to a target concentration.

Further, according to the first aspect of the invention, with the on-off valve (82) provided for the measurement passage (88) opened, part of the nitrogen-enriched air produced in the gas supply device (30) and passing through the supply passage (44) is guided to the oxygen concentration sensor (51), and the oxygen concentration sensor (51) measures the oxygen concentration of the nitrogen-enriched air.

In a second aspect of the invention related to the first aspect of the invention, the container (11) houses a fan (26) producing an air flow which passes the evaporator (24) of the refrigerant circuit (20) and circulates in the container (11), and an air passage (58) having one end opened on a blowout side of the fan (26) and the other end opened on a suction side of the fan (26) so that the air in the container (11) flows from the one end to the other end of the air passage (58) as the fan (26) rotates. The oxygen concentration sensor (51) is provided for the air passage (58) to measure the oxygen concentration of the air passing through the air passage (58). The measurement passage (88) is comprised of a branch pipe (81) which connects the supply passage (44) and the air passage (58), the branch pipe (81) diverging, and guiding to the air passage (58), part of the nitrogen-enriched air passing through the supply passage (44). The controller (55) is configured to perform, while the gas supply device (30) is in operation and a rotation of the fan (26) is stopped, a supply air measurement operation in which the on-off valve (82) is opened and the oxygen concentration sensor (51) is allowed to measure the oxygen concentration of the nitrogen-enriched air.

According to the second aspect of the invention, in the container (11), the air in the container flows from one end to the other of the air passage (58) provided in the container while the fan (26) is being rotated. As a result, during the rotation of the fan (26), the oxygen concentration sensor (51) provided for the air passage (58) measures the oxygen concentration of the air in the container. On the other hand, while the rotation of the fan (26) is stopped, the air in the container does not flow into the air passage (58). In addition, when the controller (55) performs the supply air measurement operation while the rotation of the fan (26) is stopped, part of the nitrogen-enriched air produced in the gas supply device (30) flows into the air passage (58) via the branch pipe (81) comprising the measurement passage (88). Thus, while the rotation of the fan (26) is stopped and the supply air measurement operation is performed, the oxygen concentration sensor (51) provided for the air passage (58) measures the oxygen concentration of the nitrogen-enriched air produced in the gas supply device (30).

In a third aspect of the invention related to the first or second aspect of the invention, a calibration gas introduction mechanism (83) which introduces a calibration gas for use in calibration of the oxygen concentration sensor (51) into the measurement passage (88) is provided for the measurement passage (88) to be closer to the oxygen concentration sensor (51) than the on-off valve (82).

According to the third aspect of the invention, the closed on-off valve (82) prevents the calibration gas introduced into the measurement passage (88) by the calibration gas introduction mechanism (83) from flowing in a direction opposite to the oxygen concentration sensor (51), i.e., toward the gas supply device (30), and allows the calibration gas to flow only toward the oxygen concentration sensor (51).

In a fourth aspect of the invention related to the second aspect of the invention, the evaporator (24) is provided on the blowout side of the fan (26). The container refrigeration apparatus further comprises a unit controller (100) which performs a cooling operation in which the fan (26) is rotated and the refrigerant is circulated in the refrigerant circuit (20) so that the air in the container (11) is cooled through heat exchange with the refrigerant in the evaporator (24), and a defrosting operation in which the evaporator (24) is defrosted by heating the evaporator (24) with the rotation of the fan (26) stopped. The controller (55) is configured to perform, while the unit controller (100) performs the defrosting operation, the supply air measurement operation in which the on-off valve (82) is opened and the oxygen concentration sensor (51) is allowed to measure the oxygen concentration of the nitrogen-enriched air.

According to the fourth aspect of the invention, the unit controller (100) performs a cooling operation of cooling the air in the container (11) through heat exchange with the refrigerant in the refrigerant circuit (20), and a defrosting operation of defrosting the evaporator (24) with the evaporator (24) heated.

During the defrosting operation, the evaporator (24) is heated so that frost attached to the evaporator (24) is molten and evaporated. As a result, the air in the container around the evaporator (24) contains a high amount of water vapor. The evaporator (24) is provided on the blowout side of the fan (26) where one end of the air passage (58) provided with the oxygen concentration sensor (51) opens. Further, since the unit controller (100) stops the rotation of the fan (26) during the defrosting operation, the air in the container (11) does not flow through the air passage (58). Therefore, if nothing is done during the defrosting operation, the air in the container around the evaporator (24) containing a high amount of water vapor enters the air passage (58), and may possibly cause condensation inside the air passage (58). The condensation, if occurring inside the air passage (58), may cause a malfunction of the oxygen concentration sensor (51) provided for the air passage (58), or block the flow of the air.

Therefore, in the fourth aspect of the invention, the controller (55) is configured to perform, during the defrosting operation, the supply air measurement operation in which the on-off valve (82) is opened to guide part of the nitrogen-enriched air passing through the supply passage (44) to the oxygen concentration sensor (51), and the oxygen concentration sensor (51) is allowed to measure the oxygen concentration of the nitrogen-enriched air. According to this configuration, part of the nitrogen-enriched air produced by the gas supply device (30) is forcibly supplied to the air passage (58) during the defrosting operation. Thus, the air in the container around the evaporator (24) containing a high amount of water vapor does not enter the air passage (58) to cause condensation in the air passage (58).

Advantages of the Invention

According to the first aspect of the invention, the container refrigeration apparatus includes the measurement passage (88) which guides part of the nitrogen-enriched air produced in the gas supply device (30) and passing through the supply passage (44) to the oxygen concentration sensor (51) and the on-off valve (82) which opens or closes the measurement passage (88) so that the oxygen concentration sensor (51) measures the oxygen concentration of the nitrogen-enriched air. Thus, the supply air measurement operation may be performed in which the on-off valve (82) is opened to guide part of the nitrogen-enriched air passing through the supply passage (44) to the oxygen concentration sensor (51) so as to allow the oxygen concentration sensor (51) to measure the oxygen concentration of the nitrogen-enriched air. Further, with the oxygen concentration of the nitrogen-enriched air produced in the gas supply device (30) thus measured, the performance of the gas supply device (30), i.e., whether the nitrogen-enriched air having a desired nitrogen concentration has been produced or not, may be determined. That is to say, with no nitrogen concentration sensor provided, the malfunction of the gas supply device (30) may be detected using the oxygen concentration sensor (51) which measures the oxygen concentration of the air in the container (11). Thus, according to the first aspect of the invention, in a container refrigeration apparatus including a gas supply device (30) producing nitrogen-enriched air, a malfunction of the gas supply device (30) may be detected without an increase in manufacturing costs. In addition, if the oxygen concentration of the air in the container (11) cannot be controlled to a desired level, it may be determined easily whether such control error is caused by a malfunction of the gas supply device (30) or poor airtightness of the container (11).

Further, according to the second aspect of the invention, the branch pipe (81) is connected to the existing air passage (58) provided in the container for the measurement of the oxygen concentration of the air in the container (11), and the controller (55) instructs the on-off valve (82) provided for the branch pipe (81) implemented as the measurement passage (88) to open while the rotation of the fan (26) is stopped. With this simple configuration added to the existing apparatus, the oxygen concentration of the nitrogen-enriched air produced in the gas supply device (30) may be measured.

Moreover, according to the third aspect of the invention, a calibration gas may be guided to the oxygen concentration sensor (51) via the measurement passage (88) only with the calibration gas introduction mechanism (83) provided for the measurement passage (88), without need of any additional passage for guiding the calibration gas to the oxygen concentration sensor (51). In addition, since the on-off valve (82) is provided for the measurement passage (88) to be positioned opposite to the oxygen concentration sensor (51), i.e., closer to the gas supply device (30), relative to the location of the calibration gas introduction mechanism (83), the flow of the calibration gas toward the gas supply device (30) may be blocked only by controlling the on-off valve (82) to be closed.

Further, according to the fourth aspect of the invention, during the defrosting operation, the controller (55) instructs the on-off valve (82) to open so that part of the nitrogen-enriched air passing through the supply passage (44) is forcibly supplied to the air passage (58). Thus, during the defrosting operation, the air in the container (11) around the evaporator (24) containing a high amount of water vapor as a result of evaporation of frost attached to the evaporator (24), does not enter, or cause condensation in, the air passage (58). Accordingly, the oxygen concentration sensor (51) provided for the air passage (58) does not have a substantial risk of a malfunction caused by condensed water, and there is no substantial risk of inhibition of the flow of air due to condensed water filling the air passage (58). In addition, this supply air measurement operation performed during the defrosting operation may prevent condensation inside the air passage (58), and may allow a performance check to determine whether or not the nitrogen-enriched air produced by the gas supply device (30) has a desired concentration. That is to say, according to the fourth aspect of the invention, during the defrosting operation, the occurrence of condensation inside the air passage (58) may be prevented, and the performance of the gas supply device (30) may be checked.

DESCRIPTION OF EMBODIMENTS

Embodiments of the present invention will be described with reference to the drawings. The embodiments to be described below are merely exemplary ones in nature, and do not intend to limit the scope, applications, and use of the present invention.

First Embodiment of the Present Invention

Figure 1:
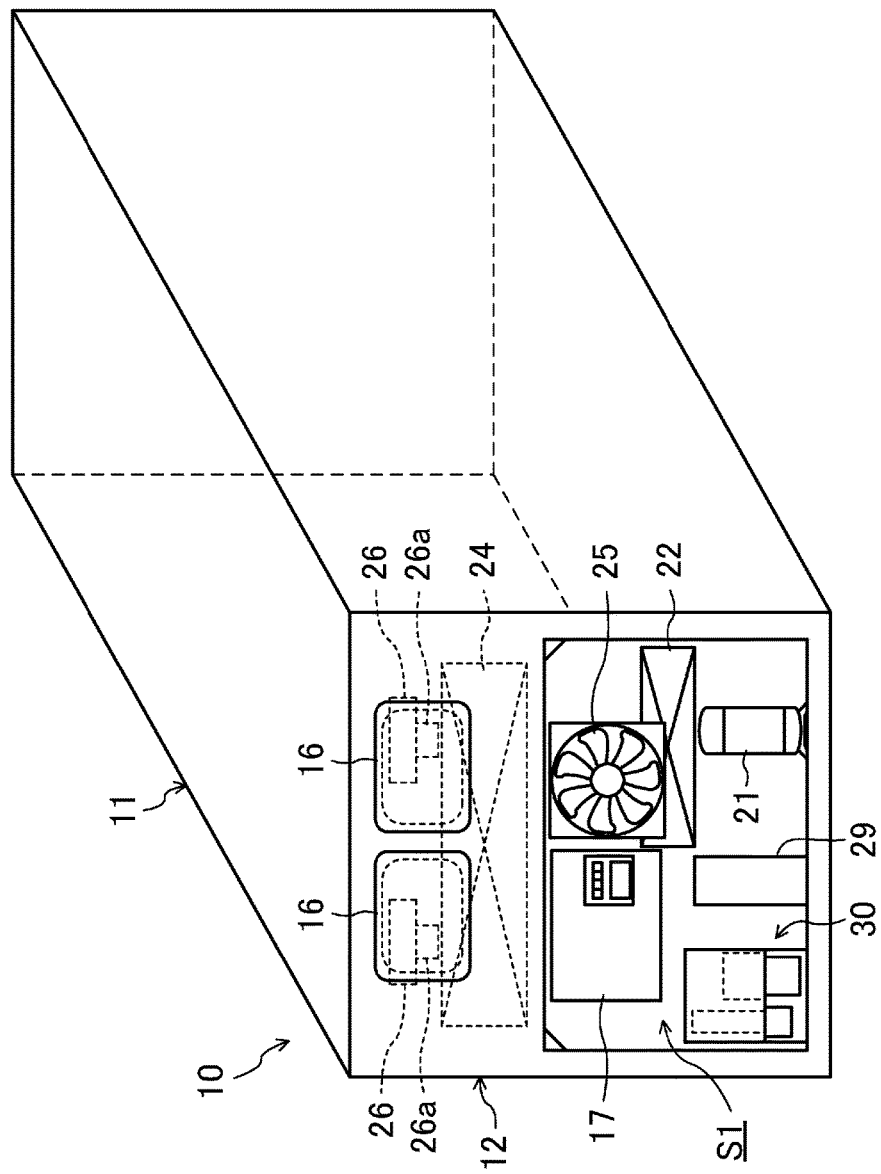
FIG. 1 is a perspective view of a container refrigeration apparatus according to a first embodiment, as viewed from the exterior of the container.
Figure 2:
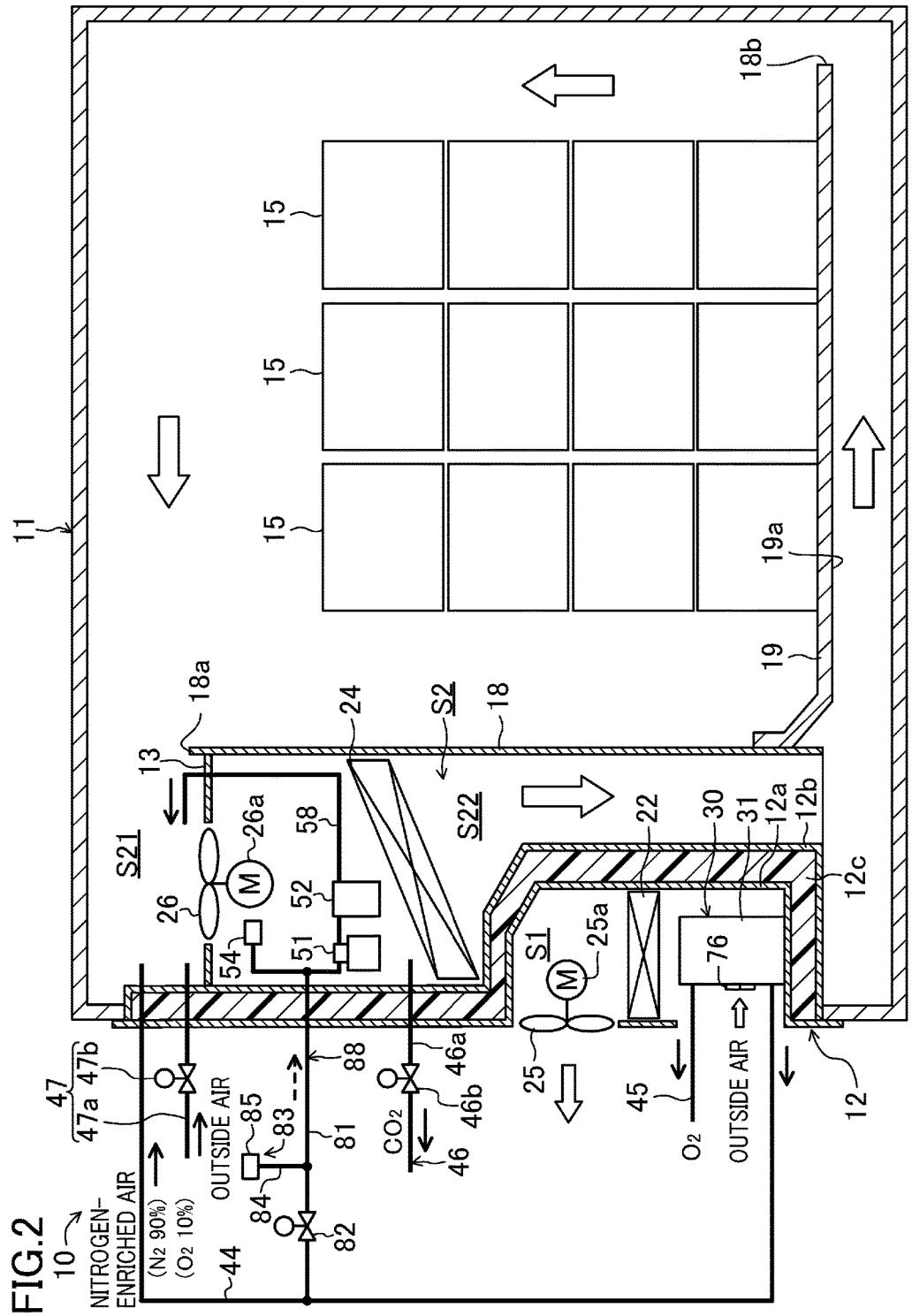
FIG. 2 is a side cross-sectional view illustrating a configuration of the container refrigeration apparatus according to the first embodiment.

As shown in FIGS. 1 and 2, a container refrigeration apparatus (10) cools air in a container (11) for use in e.g., marine transportation. The container refrigeration apparatus (10) includes a refrigerant circuit (20) which performs a refrigeration cycle to cool the air in the container (11) (see FIG. 3). In the interior of the container (11), boxed plants (15) are stored. The plants (15) perform respiration by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) is in the shape of an elongate box with an open end surface. The container refrigeration apparatus (10) includes a casing (12) and the refrigerant circuit (20), and is attached so as to close the open end of the container (11).

<Casing>

The casing (12) includes an exterior wall (12a) disposed outside the interior of the container (11) and an interior wall (12b) disposed inside the interior of the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the interior of the container (11).

The interior wall (12b) is disposed so as to face the exterior wall (12a). The interior wall (12b) protrudes, just like the lower part of the exterior wall (12a), into the interior of the container (11). A thermal insulator (12c) fills the space between the interior and exterior walls (12b, 12a).

As can be seen, the lower part of the casing (12) is formed so as to protrude into the interior of the container (11). Thus, an external storage space (S1) is formed outside the interior of the container (11) and in the lower part of the casing (12), and an internal storage space (S2) is formed inside the interior of the container (11) and in the upper part of the casing (12).

The casing (12) is provided with two opening/closing doors (16) which are arranged side by side in a width direction of the casing (12), and are openable and closable during maintenance. An electrical component box (17) is disposed in the external storage space (S1) of the casing (12) so as to be adjacent to an exterior fan (25) which will be described later. A gas supply device (30) which will be described later is disposed below the electrical component box (17). Further, an inverter box (29) is disposed in the external storage space (S1) so as to be adjacent to the gas supply device (30). The inverter box (29) houses a driver circuit driving a compressor (21), which will be described later, of the refrigerant circuit (20) at variable velocities.

A partition plate (18) is disposed in the interior of the container (11). This partition plate (18) is formed in the shape of a substantially rectangular plate member, and stands upright so as to face the wall of the casing (12) inside the interior of the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to the upper end of the partition plate (18), and has an opening in which interior fans (26), which will be described later, are disposed. This partition wall (13) partitions the internal storage space (S2) into a first space (S21) on the suction side of the interior fans (26), and a second space (S22) on the blowout side of the interior fans (26). In this embodiment, the partition wall (13) partitions the internal storage space (S2) vertically such that the first space (S21) on the suction side is disposed above the second space (S22) on the blowout side.

In the interior of the container (11), a floorboard (19) is disposed with a gap left between the floorboard (19) and the bottom surface of the container (11). On the floorboard (19), boxed plants (15) are mounted. An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) blowing the air which has been processed by the container refrigeration apparatus (10) (i.e., the air in the container cooled) into the interior of the container (11) is provided at an end of the floorboard (19) opposite from the open end of the container (11) (on the right side in FIG. 2).

The casing (12) of the container refrigeration apparatus (10) is provided with an intake portion (47) through which the outside air is sucked into the interior of the container (11), and an exhaust portion (46) through which the air in the container (11) is exhausted out of the container (11). The exhaust portion (46) has an exhaust passage (46a) connecting the interior and exterior of the container (11) together, and an exhaust valve (46b) connected to the exhaust passage (46a). The intake portion (47) has an intake passage (47a) connecting the interior and exterior of the container (11) together, and an intake valve (47b) connected to the intake passage (47a).

<Refrigerant Circuit>

Figure 3:
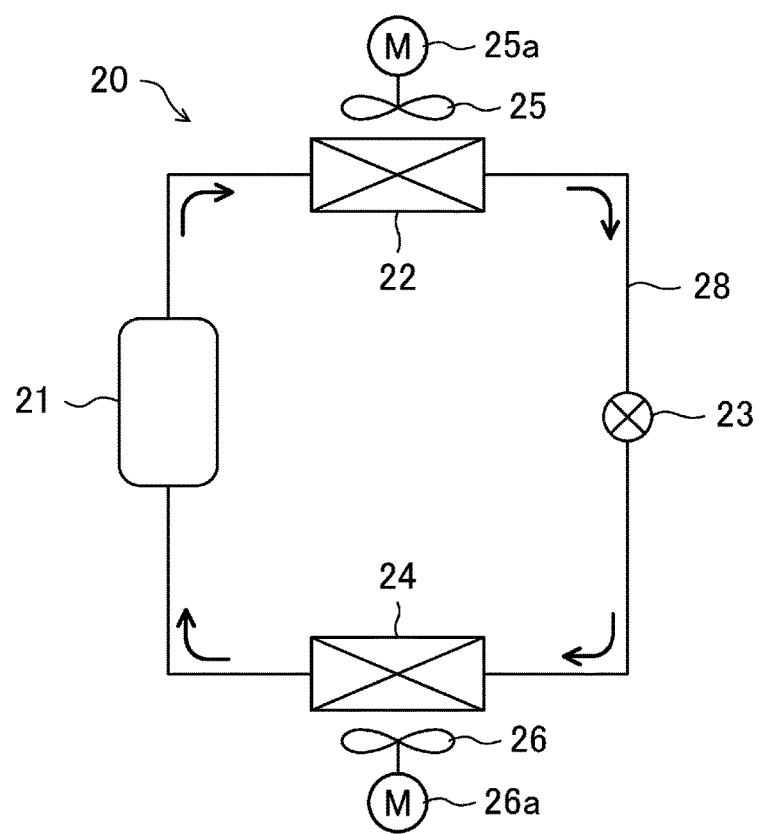
FIG. 3 is a piping system diagram illustrating a configuration of a refrigerant circuit according to the first embodiment.

As described above, the container refrigeration apparatus (10) includes a refrigerant circuit (20) where a refrigerant circulates to perform a vapor compression refrigeration cycle. As shown in FIG. 3, the refrigerant circuit (20) is a closed circuit in which a compressor (21), a condenser (22), an expansion valve (23), and the evaporator (24) are connected together in this order by refrigerant piping (28).

As shown in FIGS. 1 and 2, the compressor (21) and the condenser (22) are housed in the external storage space (S1). An exterior fan (25) is disposed above the condenser (22). The exterior fan (25) is driven in rotation by an exterior fan motor (25a), guides the outside air into the external storage space (S1) and sends it to the condenser (22). In the condenser (22), heat is exchanged between a refrigerant flowing through the condenser (22) and the outside air.

The evaporator (24) is housed in the internal storage space (S2). Two interior fans (26) are disposed above the evaporator (24) in the internal storage space (S2) and arranged side by side in the width direction of the casing (12).

The interior fans (26) are driven in rotation by interior fan motors (26a), and suck the air in the container (11) through the suction port (18a) to blow the air into the evaporator (24). In the evaporator (24), heat is exchanged between a refrigerant flowing through the evaporator (24) and the air in the container. The inside air which has dissipated heat to the refrigerant to be cooled when passing through the evaporator (24) passes through the underfloor path (19a) and is blown into the container (11) via the blowout port (18b).

<Air Passage and Sensors>

An oxygen concentration sensor (51) which measures the oxygen concentration of the air in the container (11) and a carbon dioxide concentration sensor (52) which measures the carbon dioxide concentration of the air in the container (11) are disposed in the second space (S22) of the internal storage space (S2) between the interior fans (26) and the evaporator (24). In this embodiment, the oxygen concentration sensor (51) is comprised of a galvanic-cell oxygen sensor, and the carbon dioxide concentration sensor (52) is comprised of a non-dispersive infrared (NDIR) carbon dioxide sensor. The oxygen concentration sensor (51) and the carbon dioxide concentration sensor (52) are connected to the air passage (58) through which the air in the container (11) flows when the interior fans (26) rotate.

In the internal storage space (S2), the air passage (58) is comprised of a pipe having one end opened in the second space (S22) near the blowout port of the interior fans (26), and the other end opened in the first space (S21) near the suction port of the interior fans (26). A membrane filter (54) is provided at the end of the air passage (58) opened near the blowout port of the interior fan (26). The oxygen concentration sensor (51) is connected to a portion of the air passage (58) closer to the one end of the air passage (58), i.e., the end of the air passage (58) opening near the blowout port of the interior fans (26), than the carbon dioxide concentration sensor (52) is. In this configuration, while the interior fans (26) are rotating, the ambient pressure on the blowout side of the interior fans (26), where the one end of the air passage (58) opens, becomes higher than the ambient pressure on the suction side of the interior fans (26), where the other end of the air passage (58) opens. As a result, the air in the container (11) flows from the one end of the air passage (58) to the other end of the air passage (58), and passes through the oxygen concentration sensor (51) and the carbon dioxide concentration sensor (52) in this order.

<Gas Supply Device>

The container refrigeration apparatus (10) includes a gas supply device (30) which produces nitrogen-enriched air with a low oxygen concentration to be supplied to the interior of the container (11). A controller (55) (see FIG. 4) controls the operation of the gas supply device (30). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

Figure 4:
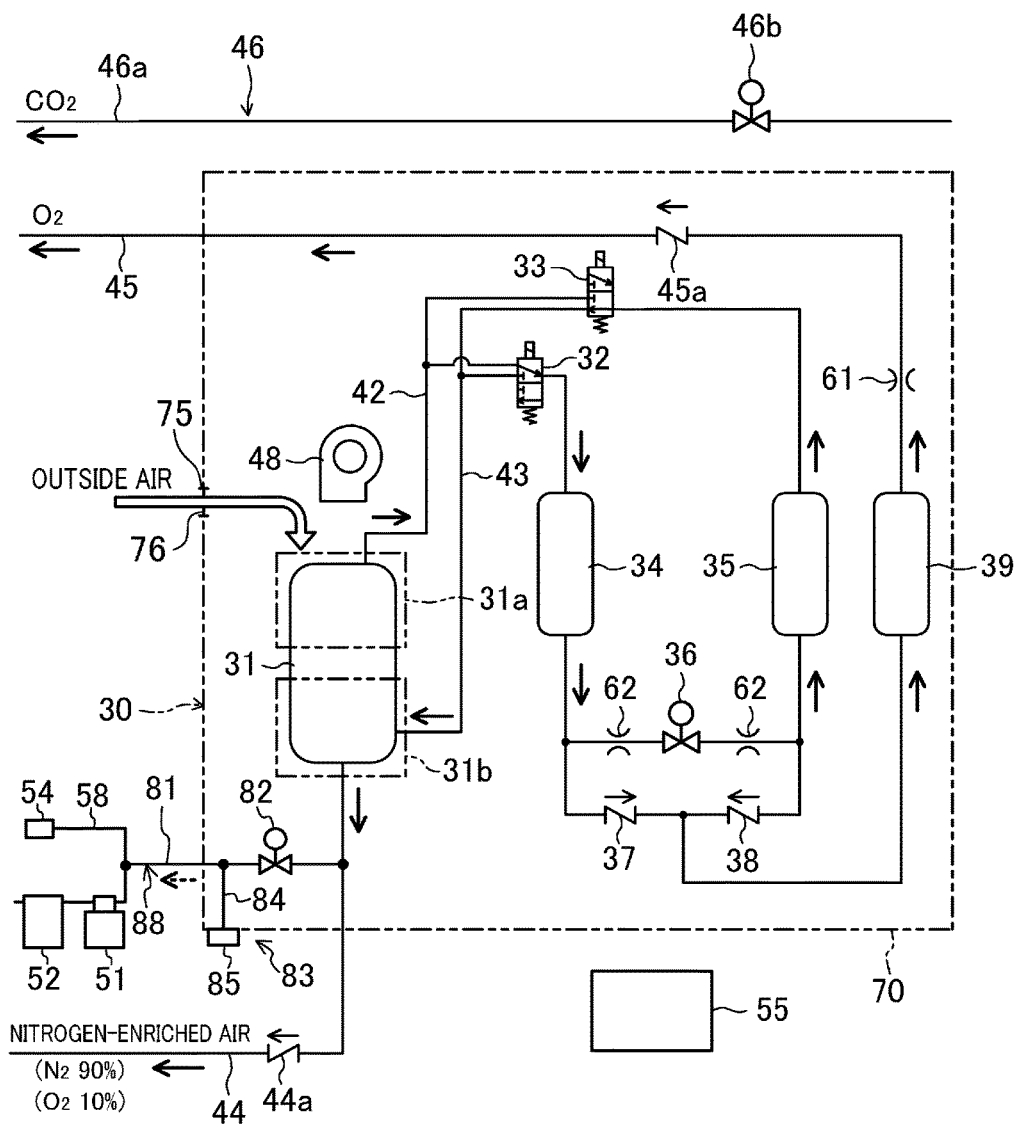
FIG. 4 is a piping system diagram illustrating a configuration of a gas supply device according to the first embodiment.

As shown in FIG. 4, the gas supply device (30) includes an air pump (31), first and second directional control valves (32) and (33), first and second adsorption columns (34) and (35) each provided with an adsorbent for adsorbing nitrogen in the air, a purge valve (36), first and second check valves (37) and (38), an oxygen tank (39), and a unit case (70) housing these components. The gas supply device (30) of this embodiment forms a single unit with these components housed in a unit case (70). This configuration allows the gas supply device (30) to be attached later to the container refrigeration apparatus (10).

The air pump (31) is disposed in the unit case (70). This air pump (31) includes a first pumping mechanism (31a) and a second pumping mechanism (31b).

The first pumping mechanism (31a) of the air pump (31) sucks outside air from the exterior to the interior of the unit case (70) through an air inlet port (75) formed through the unit case (70) to compress the air. This first pumping mechanism (31a) pressurizes the first and second adsorption columns (34) and (35) by supplying the columns (34, 35) with the compressed air through a discharge passage (42) to perform an adsorption operation of adsorbing nitrogen in the air onto the adsorbent. An air-permeable, waterproof membrane filter (76) is fitted in the air inlet port (75) of the unit case (70).

The second pumping mechanism (31b) of the air pump (31) depressurizes the first and second adsorption columns (34) and (35) by sucking the air from the columns (34, 35) through a suction passage (43) to perform a desorption operation of desorbing nitrogen from the adsorbent. It is recommended that the second pumping mechanism (31b) be configured to reduce the internal pressure of each of the first and second adsorption columns (34) and (35) to a negative pressure (i.e., a pressure lower than the atmospheric pressure) during the desorption operation.

The first and second pumping mechanisms (31a) and (31b) of the air pump (31) are configured as oil-less pumps without lubricant oil. The first pumping mechanism (31a) is an air compressor compressing the air sucked to a pressure higher than the atmospheric pressure and discharging it to a destination. The second pumping mechanism (31b) is an exhaust pump sucking the air from a component connected to this pump and exhausting the air.

Here, suppose that oil is used in the pump of the first pumping mechanism (31a). In such a situation, when the first and second adsorption columns (34) and (35) are pressurized by being supplied with the compressed air, the oil included in the compressed air is adsorbed onto the adsorbent, resulting in a decrease in the adsorption performance of the adsorbent. On the other hand, if oil is used in the pump of the second pumping mechanism (31b), the oil is supplied to the interior of the container (11) together with the nitrogen-enriched air containing nitrogen desorbed from the first and second adsorption columns (34) and (35). That is to say, in that case, the nitrogen-enriched air with oily odor is supplied to the interior of the container (11) loaded with plants (15). Thus, this embodiment is configured to overcome such a disadvantage by implementing the first and second pumping mechanisms (31a) and (31b) of the air pump (31) as oil-less pumps.

A blower fan (48) is disposed above the air pump (48) to cool the air pump (31) by blowing air to the air pump (31).

The first and second directional control valves (32) and (33) are used to alternately switch the targets of adsorption operation or desorption operation between the first and second adsorption columns (34) and (35). In the state shown in FIG. 4, the adsorption operation is performed on the first adsorption column (34), and the desorption operation is performed on the second adsorption column (35).

Although not shown, if the positions of the first and second directional control valves (32) and (33) are opposite from those in FIG. 4, the adsorption operation is performed on the second adsorption column (35), and the desorption operation is performed on the first adsorption column (34), although not illustrated. The gas supply device (30) repeatedly performs the above-described process while interchanging the targets of the adsorption and desorption operations between the first and second adsorption columns (34) and (35), thereby continuously producing nitrogen-enriched air in a stable manner. This switching operation is controlled by the controller (55).

The first and second adsorption columns (34) and (35) are configured as cylindrical members filled with an adsorbent, and are disposed upright (i.e., disposed such that each axis direction thereof is a vertical direction). The first and second adsorption columns (34) and (35) produce oxygen-enriched air by adsorbing nitrogen in the compressed air supplied from the first pumping mechanism (31a) of the air pump (31). The adsorbent that fills the first and second adsorption columns (34) and (35) absorbs nitrogen in a state where the adsorption columns (34, 35) are pressurized, and desorbs nitrogen in a state where these adsorption columns (34, 35) are depressurized.

The adsorbent that fills the first and second adsorption columns (34) and (35) may be comprised of porous zeolite having pores with a diameter that is, e.g., smaller than the diameter of nitrogen molecules (3.0 angstrom) and larger than the diameter of oxygen molecules (2.8 angstrom). By using zeolite having pores of such a diameter as adsorbent, nitrogen in the air may be absorbed.

In the pores of zeolite, cations exist, and thus, an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen in the air but also moisture (vapor) in the air. The moisture adsorbed onto the adsorbent is desorbed, together with nitrogen, from the adsorbent as a result of the desorption operation. As a result, nitrogen-enriched air including moisture is supplied to the interior of the container (11), thus increasing the humidity in the interior of the container (11). Furthermore, the adsorbent is regenerated, and therefore, may have its life extended.

If the first and second adsorption columns (34) and (35) are depressurized by the second pumping mechanism (31b) of the air pump (31), the nitrogen adsorbed onto the adsorbent is desorbed. This produces nitrogen-enriched air that has had its oxygen concentration lowered by including more nitrogen than the outside air does. This nitrogen-enriched air may be 90% nitrogen and 10% oxygen, for example.

In a conventional device of producing a high-purity nitrogen gas having a nitrogen concentration of more than 99% using a membrane separator, the pressurization pressure of an air pump is set to be a relatively high value (of about 827.6 kPa, for example).

In contrast, the gas supply device (30) according to this embodiment may produce nitrogen-enriched air which is 90% nitrogen and 10% oxygen. Thus, it is sufficient to set the pressurization pressure of the air pump (31) to be a relatively low value (of about 150 kPa, for example). Accordingly, in the gas supply device (30) of this embodiment, the pressurization pressure of the air pump (31) does not need to be as high as in the conventional one. As a result, the size of the first pumping mechanism (31a) may be reduced.

The nitrogen-enriched air is supplied to the interior of the container (11) through a supply passage (44) connected to the gas supply device (30). The supply passage (44) is provided with a check valve (44a).

The respective lower ends of each of the first and second adsorption columns (34) and (35) (functioning as an outlet port during pressurization and an inlet port during depressurization) communicate with an oxygen tank (39) via first and second check valves (37) and (38) preventing backflow.

The oxygen tank (39) temporarily retains oxygen-enriched air produced in the first and second adsorption columns (34) and (35). The outlet port of the oxygen tank (39) is connected to an oxygen exhaust passage (45) communicating with the exterior of the container (11). The oxygen exhaust passage (45) is provided with an orifice (61) and a check valve (45a). The oxygen-enriched air retained in the oxygen tank (39) is depressurized in the orifice (61), and then, is exhausted out of the container (11) through the oxygen exhaust passage (45).

The respective lower ends of the first and second adsorption columns (34) and (35) communicate with each other via the purge valve (36). An orifice (62) is attached to the pipe between the lower end of the first adsorption column (34) and the purge valve (36), and another orifice (62) is attached to the pipe between the lower end of the second adsorption column (35) and the purge valve (36).

The purge valve (36) is used to introduce a predetermined amount of the oxygen-enriched air into an adsorption column on the depressurization side (the second adsorption column (35) in FIG. 4) from an adsorption column on the pressurization side (the first adsorption column (34) in FIG. 4) to support release of nitrogen from the adsorbent of the adsorption columns (35, 34) on the depressurization side. The controller (55) controls an opening/closing operation of the purge valve (36).

<Measurement Passage and Measurement On-Off Valve>

The container refrigeration apparatus (10) further includes a measurement passage (88) which introduces part of the nitrogen-enriched air produced by the gas supply device (30) and passing through the supply passage (44) to the oxygen concentration sensor (51) provided in the internal storage space (S2), and a measurement on-off valve (82) provided for the measurement passage (88).

The measurement passage (88) is comprised of a branch pipe (81) which diverges, and guides to the air passage (58), part of the nitrogen-enriched air passing through the supply passage (44). The branch pipe (81) has one end connected to the supply passage (44) in the unit case (70), and the other end connected to the air passage (58) between the oxygen concentration sensor (51) and the membrane filter (54).

The measurement on-off valve (82) is connected to the branch pipe (81) in the interior of the unit case (70). The opening/closing operation of the measurement on-off valve (82) is controlled by the controller (55). The measurement on-off valve (82) of this embodiment is opened only while a supply air measurement operation, which will be described later, is performed, and is closed during other operations. The details will be described later.

<Calibration Gas Introduction Mechanism>

In this embodiment, the container refrigeration apparatus (10) includes a calibration gas introduction mechanism (83) which introduces, into the measurement passage (88), a calibration gas used for calibration of the oxygen concentration sensor (51) and the carbon dioxide concentration sensor (52). The calibration gas introduction mechanism (83) has an introduction pipe (84) and a connecting joint (85) attached to the end of the introduction pipe (84). The introduction pipe (84) has one end connected to the branch pipe (81) in the interior of the unit case (70), and the other end having the connecting joint (85) attached thereto. More particularly, the one end of the introduction pipe (84) is connected to a portion of the branch pipe (81) closer to the air passage (58) (closer to the oxygen concentration sensor (51)) relative to the measurement on-off valve (82). The connecting joint (85) is fixed to the unit case (70), and is configured such that a supply pipe of a gas cylinder retaining the calibration gas is connected externally to the unit case (70).

Operations

<Operation of Refrigerant Circuit>

[Cooling Operation]

In this embodiment, a unit controller (not shown) performs a cooling operation of cooling the air in the container (11).

During the cooling operation, a cooling operation controller controls the operation of the compressor (21), the expansion valve (23), and the exterior and interior fans (25) and (26) based on the measurement result of a temperature sensor (not shown) so that the temperature of the air in the container reaches a desired target temperature. In this case, the refrigerant circuit (20) performs a vapor compression refrigeration cycle, and the air in the container (11) guided to the evaporator (24) by the interior fans (26) is cooled by the refrigerant flowing through the evaporator (24), and then blown again into the container (11). Thus, the air in the container (11) is cooled.

[Defrosting Operation]

Further, in this embodiment, at a predetermined timing when it is assumed that frost has formed on the evaporator (24), a unit controller (not shown) performs, during the cooling operation, a defrosting operation of defrosting the evaporator (24) by heating it.

In this embodiment, as an exemplary defrosting operation, a defrosting operation of heating the evaporator (24) with an electric heater (not shown) is performed. In this case, the unit controller stops the rotation of the exterior and interior fans (25) and (26). As the evaporator (24) is heated by the electric heater, frost attached to the evaporator (24), e.g., fins and tubes thereof, melts and eventually evaporates. In this manner, the evaporator (24) is defrosted. Note that the defrosting operation may be performed in any way as long as the evaporator (24) is defrosted by heating. For example, if the refrigerant circuit (20) is configured to have a switching valve so that the refrigerant circulates reversibly, a reverse-cycle defrosting operation in which the refrigerant circulates in the refrigerant circuit (20) in a direction opposite to the direction during the cooling operation may be performed. In that case, in the refrigerant circuit (20), a so-called high-pressure refrigerant compressed by the compressor (21) is supplied to the evaporator (24), and frost attached to the evaporator (24), e.g., fins and tubes thereof, melts as it absorbs heat from the high-pressure refrigerant, and eventually evaporates. Thus, the evaporator (24) is defrosted.

<Concentration Control Operation>

Further, in this embodiment, the controller (55) performs a concentration control operation of controlling the oxygen concentration and carbon dioxide concentration of the air in the container (11) to desired concentrations, respectively. During the concentration control operation, the controller (55) controls the operation of the gas supply device (30), the intake portion (47), and the exhaust portion (46) based on the measurement results of the oxygen concentration sensor (51) and carbon dioxide concentration sensor (52) so that the oxygen concentration and carbon dioxide concentration of the air in the container (11) reach the desired target concentrations (e.g., 5% of oxygen and 5% of carbon dioxide). During the concentration control operation, the controller (55) instructs the measurement on-off valve (82) to close so that the oxygen concentration sensor (51) measures the oxygen concentration of the air in the container, and the carbon dioxide concentration sensor (52) measures the carbon dioxide concentration of the air in the container.

<Control of Oxygen Concentration>

Specifically, first, the controller (55) determines whether or not the oxygen concentration of the air in the container measured by the oxygen concentration sensor (51) is higher than that of the nitrogen-enriched air (consisting of 10% oxygen). If the oxygen concentration of the air in the container is higher than that of the nitrogen-enriched air, the nitrogen-enriched air (consisting 90% nitrogen and 10% oxygen) is produced in the gas supply device (30), and supplied through the supply passage (44) into the container (11). That is to say, an operation of reducing the oxygen concentration of the air in the container (11) is performed.

Thereafter, the controller (55) determines whether or not the oxygen concentration measured by the oxygen concentration sensor (51) has decreased to be equal to or less than the oxygen concentration (consisting of 10% oxygen) of the nitrogen-enriched air. If the oxygen concentration of the air in the container has decreased to be equal to or less than that of the nitrogen-enriched air, supply of the nitrogen-enriched air is stopped. In this case, plants (15) stored in the interior of the container (11) perform respiration. Thus, the plants (15) absorb oxygen from the interior of the container (11), and release carbon dioxide to the interior of the container (11).

Next, the controller (55) determines whether or not the oxygen concentration in the air in the container measured by the oxygen concentration sensor (51) has decreased to be less than a target oxygen concentration (of 5%). In this embodiment, if the plants (15) are bananas, the target concentration of the oxygen concentration is set to be 5%. If the plants (15) are avocados, however, it is recommended that the target concentration be set to be 3%. If the oxygen concentration in the air in the container has decreased to be less than the target concentration, nitrogen-enriched air (consisting of 90% nitrogen and 10% oxygen) is produced in the gas supply device (30), and supplied into the container (11). Alternatively, outside air having a higher oxygen concentration than the nitrogen-enriched air is supplied through the intake portion (47) to the interior of the container (11). That is to say, an operation of increasing the oxygen concentration in the air in the container (11) is performed. Note that the supply of the nitrogen-enriched air and the supply of the outside air may be performed simultaneously. Thereafter, the series of process steps described above will be repeatedly performed all over again.

<Control of Carbon Dioxide Concentration>

In contrast, the carbon dioxide concentration of the air in the container is controlled in the following manner. In this case, first, the controller (55) determines whether or not the carbon dioxide concentration of the air in the container measured by the carbon dioxide concentration sensor (52) is higher than a predetermined target concentration (of 5%). In this embodiment, if the plants (15) are bananas, the target concentration of carbon dioxide is set to 5%. If the plants (15) are avocados, it is recommended that the target concentration be set to 10%.

If the carbon dioxide concentration of the air in the container is higher than the target concentration, the nitrogen-enriched air (consisting 90% nitrogen and 10% oxygen) is produced in the gas supply device (30), and supplied into the container (11). Alternatively, the air in the container (11) is exhausted through the exhaust portion (46) out of the container. That is to say, an operation of reducing the carbon dioxide concentration of the air in the container (11) is performed. In this case, the supply of the nitrogen-enriched air and the exhaustion of the air out of the container may be performed simultaneously.

Then, the controller (55) determines whether or not the carbon dioxide concentration of the air in the container measured by the carbon dioxide concentration sensor (52) has decreased to be equal to or less than the target carbon dioxide concentration. If the carbon dioxide concentration of the air in the container has decreased to be equal to or less than the target concentration, the supply of the nitrogen-enriched air is stopped, or the exhaustion of the air out of the container is stopped. Thereafter, the series of process steps described above is performed all over again.

According to the control described above, the oxygen concentration and carbon dioxide concentration of the air in the container (11) are controlled to desired target concentrations, respectively (e.g., 5% of oxygen and 5% of carbon dioxide).

[Supply Air Measurement Operation]

In this embodiment, while the gas supply device (30) is producing the nitrogen-enriched air and the interior fans (26) are stopped, such as during the concentration control operation or a test run, the controller (55) performs a supply air measurement operation of measuring the oxygen concentration of the nitrogen-enriched air. The controller (55) performs the supply air measurement operation in accordance with a command entered by a user or periodically (e.g., every ten days).

During the supply air measurement operation, the controller (55) controls the operation of the gas supply device (30), the intake portion (47), and the exhaust portion (46) in the same manner as during the concentration control operation. On the other hand, during the supply air measurement operation, the controller (55) instructs the measurement on-off valve (82) to open such that the oxygen concentration sensor (51) measures the oxygen concentration of the nitrogen-enriched air produced by the gas supply device (30).

If the measurement on-off valve (82) is opened while the gas supply device (30) is working, part of the nitrogen-enriched air produced by the gas supply device (30) and passing through the supply passage (44) is diverged and flows into the branch pipe (81) implemented as the measurement passage (88). The nitrogen-enriched air that entered the branch pipe (81) eventually flows into the air passage (58), and passes through the oxygen concentration sensor (51). In this manner, during the supply air measurement operation, part of the nitrogen-enriched air passing through the supply passage (44) is guided via the measurement passage (88) to the oxygen concentration sensor (51). Thus, the oxygen concentration of the nitrogen-enriched air produced in the gas supply device (30) is measured by the oxygen concentration sensor (51) provided to measure the oxygen concentration of the air in the container.

During the defrosting operation, the evaporator (24) is heated so that frost attached to the evaporator (24) melts and evaporates. As a result, the air in the container around the evaporator (24) contains a high amount of water vapor. In contrast, the evaporator (24) is disposed on the blowout side of the interior fans (26) where one end of the air passage (58) provided with the oxygen concentration sensor (51) opens. Further, since the unit controller stops the rotation of the interior fans (26) during the defrosting operation, the air in the container (11) does not flow in the air passage (58). Therefore, if nothing is done during the defrosting operation, the air in the container around the evaporator (24) containing a high amount of water vapor enters the air passage (58), and may possibly cause condensation inside the air passage (58). The condensation, if occurring inside the air passage (58), may cause a malfunction of the oxygen concentration sensor (51) provided for the air passage (58), or block the flow of the air.

Thus, according to this embodiment, the controller (55) is configured to perform the supply air measurement operation at any rate during the defrosting operation. In this configuration, part of the nitrogen-enriched air produced by the gas supply device (30) is forcibly supplied to the air passage (58) during the defrosting operation. Thus, the air in the container around the evaporator (24) containing a high amount of water vapor does not enter, or cause condensation in, the air passage (58).

<Calibration Operation>

Further, in this embodiment, while both of the cooling operation and the concentration control operation are stopped, the controller (55) performs a calibration operation of calibrating the oxygen concentration sensor (51) or the carbon dioxide concentration sensor (52) in accordance with a command entered by a user. The calibration operation is performed in a state where a supply pipe of a gas cylinder retaining a calibration gas is connected to the connecting joint (85) of the calibration gas introduction mechanism (83).

During the calibration operation, the controller (55) instructs the measurement on-off valve (82) to close so that a calibration gas retained in the gas cylinder is not discharged outside, but is guided to the oxygen concentration sensor (51) or the carbon dioxide concentration sensor (52). The controller (55) calibrates the oxygen concentration sensor (51) or the carbon dioxide concentration sensor (52) so that a signal indicating the measured concentration supplied from the oxygen concentration sensor (51) or the carbon dioxide concentration sensor (52) becomes a signal indicating a reference concentration (of 0%).

Advantages of First Embodiment

As can be seen from the foregoing, the container refrigeration apparatus (10) of this embodiment includes the measurement passage (88) which guides part of the nitrogen-enriched air produced in the gas supply device (30) and passing through the supply passage (44) to the oxygen concentration sensor (51) and the measurement on-off valve (82) which opens or closes the measurement passage (88) so that the oxygen concentration sensor (51) measures the oxygen concentration of the nitrogen-enriched air. Thus, with the measurement on-off valve (82) opened to guide part of the nitrogen-enriched air passing through the supply passage (44) to the oxygen concentration sensor (51), the oxygen concentration sensor (51) may measure the oxygen concentration of the nitrogen-enriched air. Further, with the oxygen concentration of the nitrogen-enriched air produced in the gas supply device (30) thus measured, the performance of the gas supply device (30), i.e., whether the nitrogen-enriched air having a desired nitrogen concentration has been produced or not, may be determined. That is to say, malfunctions of the gas supply device (30) may be detected without providing a nitrogen concentration sensor, by using the oxygen concentration sensor (51) which measures the oxygen concentration of the air in the container (11). Thus, according to the container refrigeration apparatus (10) of this embodiment, in a container refrigeration apparatus (10) including a gas supply device (30) producing nitrogen-enriched air, malfunctions of the gas supply device (30) may be detected without an increase in manufacturing costs. In addition, if the oxygen concentration of the air in the container (11) cannot be controlled to a desired level, it may be determined easily whether such control error is caused by the malfunction of the gas supply device (30) or poor airtightness of the container (11).

Further, according to the container refrigeration apparatus (10) of this embodiment, the branch pipe (81) is connected to the existing air passage (58) provided in the container for the measurement of the oxygen concentration of the air in the container (11), and the controller (55) instructs the measurement on-off valve (82) provided for the branch pipe (81) implemented as the measurement passage (88) to open while the rotation of the fans (26) is stopped. With this simple configuration added to the existing apparatus, a supply air measurement operation of measuring the oxygen concentration of the nitrogen-enriched air produced in the gas supply device (30) may be performed.

Moreover, according to the container refrigeration apparatus (10) of this embodiment, a calibration gas may be guided to the oxygen concentration sensor (51) via the measurement passage (88) only with the calibration gas introduction mechanism (83) provided for the measurement passage (88), without having to provide any additional passage for guiding the calibration gas to the oxygen concentration sensor (51). In addition, since the measurement on-off valve (82) is provided for the measurement passage (88) to be positioned opposite to the oxygen concentration sensor (51), i.e., closer to the gas supply device (30), relative to the location of the calibration gas introduction mechanism (83), the flow of the calibration gas toward the gas supply device (30) may be blocked only by controlling the measurement on-off valve (82) to be closed.

Besides, according to the container refrigeration apparatus (10) of this embodiment, during the defrosting operation, the controller (55) instructs the measurement on-off valve (82) to open so that part of the nitrogen-enriched air passing through the supply passage (44) is forcibly supplied to the air passage (58). Thus, during the defrosting operation, the air in the container (11) around the evaporator (24), which contains a high amount of water vapor as a result of evaporation of frost attached to the evaporator (24), does not enter, or cause condensation in, the air passage (58). Accordingly, the oxygen concentration sensor (51) provided for the air passage (58) does not have a substantial risk of a malfunction caused by condensed water, and there is no substantial risk of inhibition of the flow of air due to condensed water filling the air passage (58). In addition, this supply air measurement operation performed during the defrosting operation may prevent condensation inside the air passage (58), and may allow a performance check to determine whether or not the nitrogen-enriched air produced by the gas supply device (30) has a desired concentration. That is to say, according to the container refrigeration apparatus (10) of this embodiment, during the defrosting operation, the occurrence of condensation inside the air passage (58) may be prevented, and the performance of the gas supply device (30) may be checked.

Second Embodiment of the Present Invention

As shown in FIGS. 5-12, a container refrigeration apparatus (10) of a second embodiment includes a casing (12), a refrigerant circuit (20), and a controlled atmosphere system (CA system) (60), and is attached to close an open end of a container (11)

<Casing>

Figure 5:
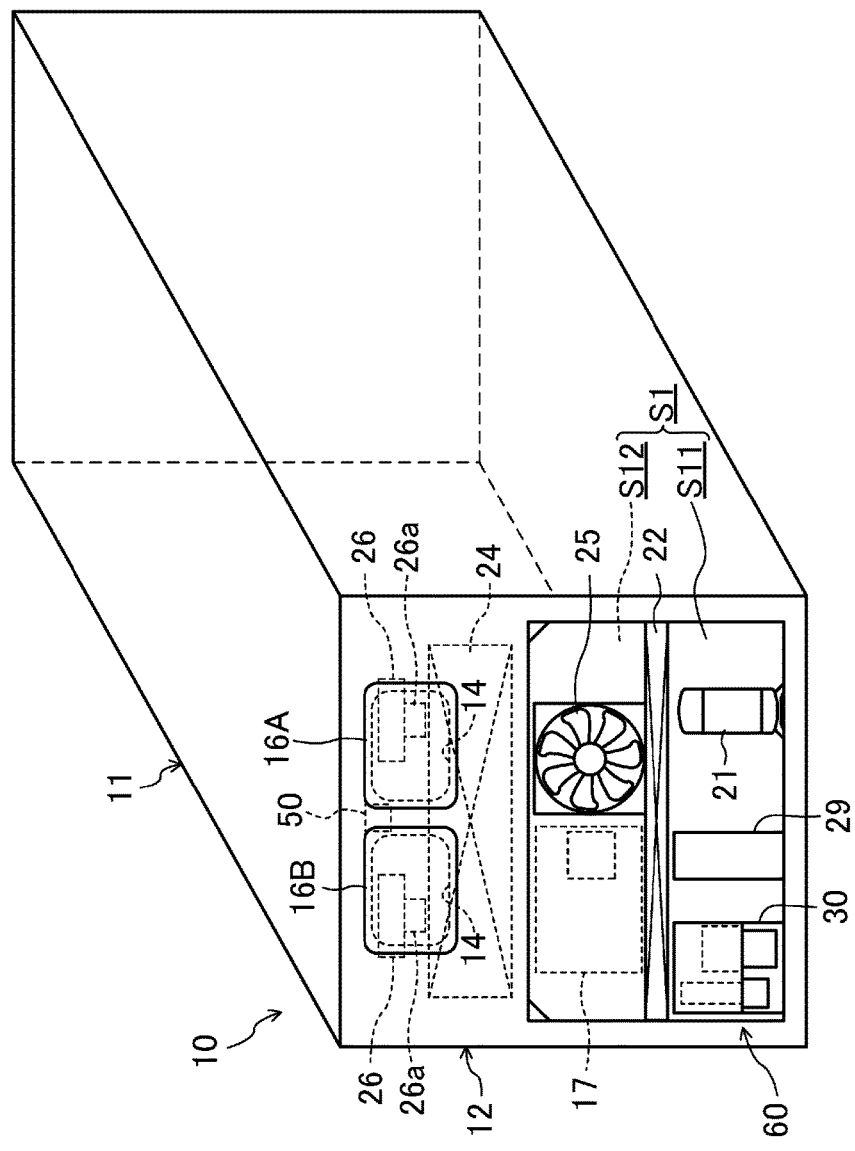
FIG. 5 is a perspective view of a container refrigeration apparatus according to a second embodiment, as viewed from the exterior of the container.

As shown in FIG. 5, the casing (12) is configured substantially in the same manner as that of the first embodiment. According to the second embodiment, the casing (12) is provided with two access openings (14) for maintenance which are arranged side by side in a width direction of the casing (12). The two access openings (14) are closed respectively by first and second access doors (16A, 16B) which are openable and closable. Each of the first and second access doors (16A, 16B) is comprised of, just like the casing (12), an exterior wall, an interior wall, and a thermal insulator.

<Refrigerant Circuit>

Figure 7:
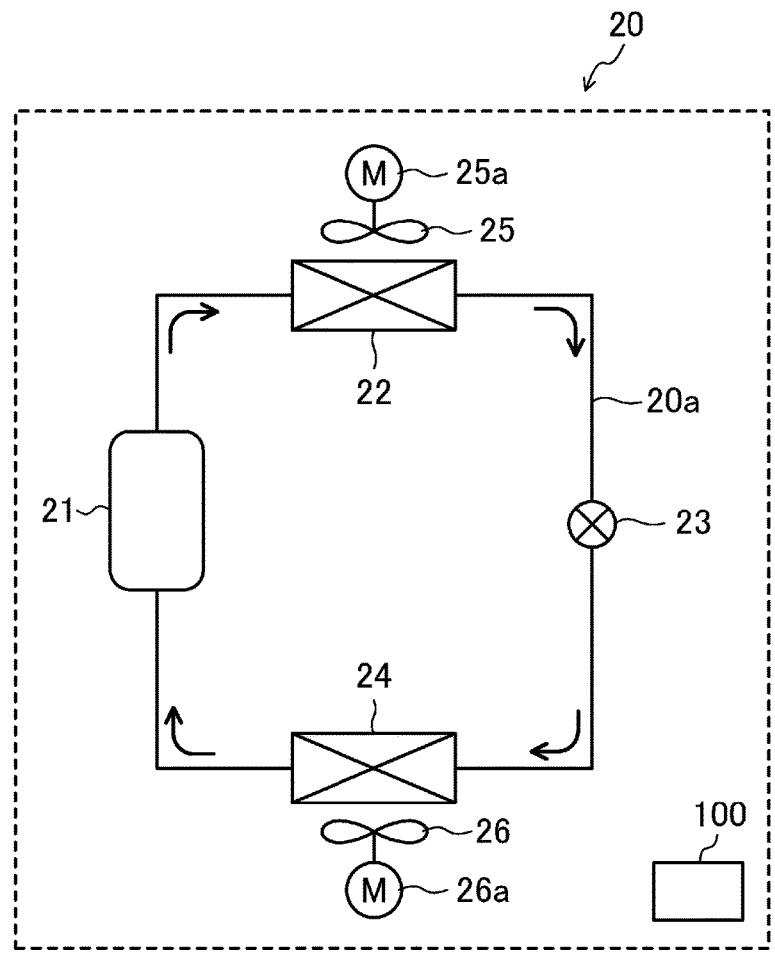
FIG. 7 is a piping system diagram illustrating a configuration of a refrigerant circuit of the container refrigeration apparatus according to the second embodiment.

As shown in FIG. 7, a refrigerant circuit (20) is configured substantially in the same manner as that of the first embodiment. That is, also in the second embodiment, the refrigerant circuit (20) is a closed circuit in which a compressor (21), a condenser (22), an expansion valve (23), and an evaporator (24) are connected together in this order by refrigerant piping (20a).

An exterior fan (25) is disposed near the condenser (22). The exterior fan (25) is driven in rotation by an exterior fan motor (25), guides air in the exterior of the container (11) (outside air) into an external storage space (S1), and sends it to the condenser (22). In the condenser (22), heat is exchanged between a refrigerant compressed in a compressor (21) and flowing through the condenser (22) and the outside air sent from the exterior fan (25) to the condenser (22). In this embodiment, the exterior fan (25) is comprised of a propeller fan.

Two interior fans (26) are disposed near the evaporator (24). The interior fans (26) are driven in rotation by interior fan motors (26a), and guide the air in the container (11) through a suction port (18a) to blow the air into the evaporator (24). In the evaporator (24), heat is exchanged between a refrigerant flowing through the evaporator (24) and having its pressure decreased by the expansion valve (23) and the air in the container sent to the evaporator (24) by the interior fans (26).

Figure 6:
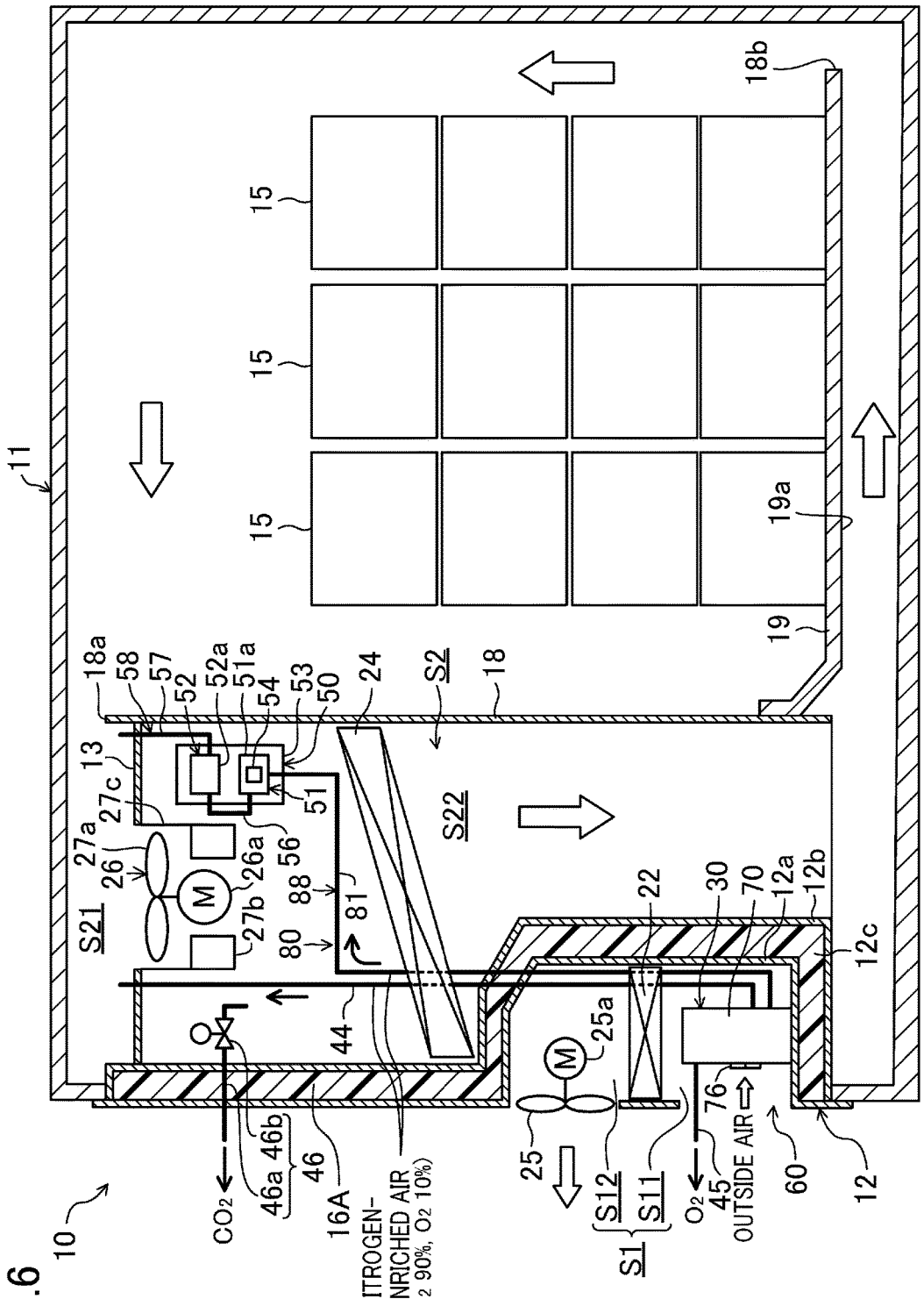
FIG. 6 is a side cross-sectional view illustrating a general configuration of a container refrigeration apparatus according to the second embodiment.

As shown in FIG. 6, each of the interior fans (26) includes a propeller fan (rotary vane) (27a), a plurality of stationary vanes (27b), and a fan housing (27c). The propeller fan (27a) is coupled to the interior fan motor (26a), and driven in rotation by the interior fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 5, the compressor (21) and the condenser (22) are housed in an external storage space (S1). The condenser (22) is provided in the middle of the external storage space (S1) in the vertical direction so as to divide the external storage space (S1) into a first space (S11) and a second space (S12) disposed above the first space (S11). Provided in the first space (S11) are the compressor (21), an inverter box (29) housing a driver circuit driving the compressor (21) at variable velocities, and a gas supply device (30) of the CA system (60). On the other hand, the exterior fan (25) and an electrical component box (17) are provided in the second space (S12). The first space (S11) is opened to the external space of the container (11), while the second space (S12) is blocked from the external space of the container by a plate member such that only a blowout port of the exterior fan (25) opens to the external space of the container.

On the other hand, as shown in FIG. 6, the evaporator (24) is housed in the second space (S22) of the internal storage space (S2). The two interior fans (26) are disposed above the evaporator (24) in the internal storage space (S2) and arranged side by side in the width direction of the casing (12).

<CA System>

Figure 8:
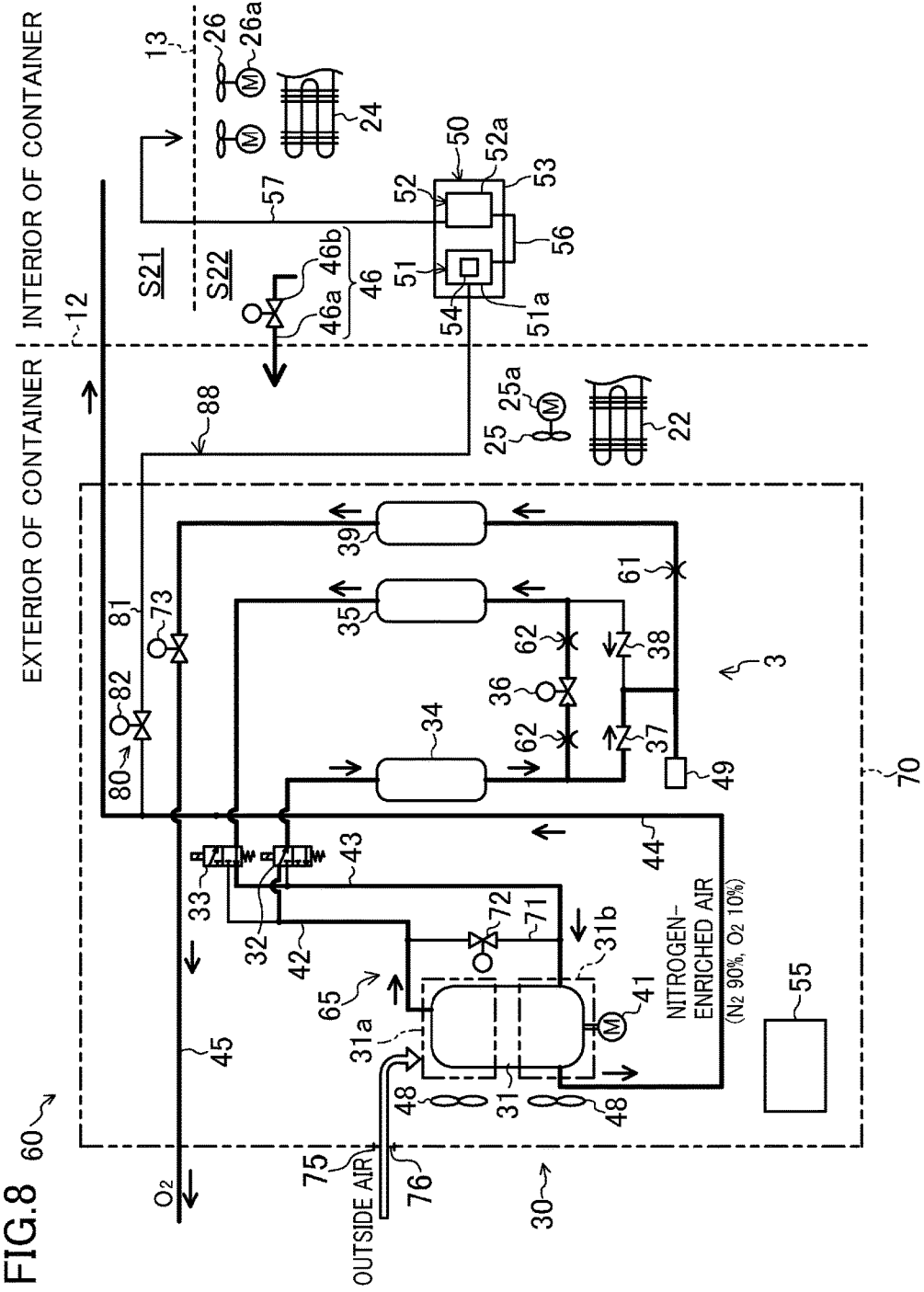
FIG. 8 is a piping system diagram illustrating a configuration of a CA system of the container refrigeration apparatus according to the second embodiment, together with an air flow in a first flow state.
Figure 9:
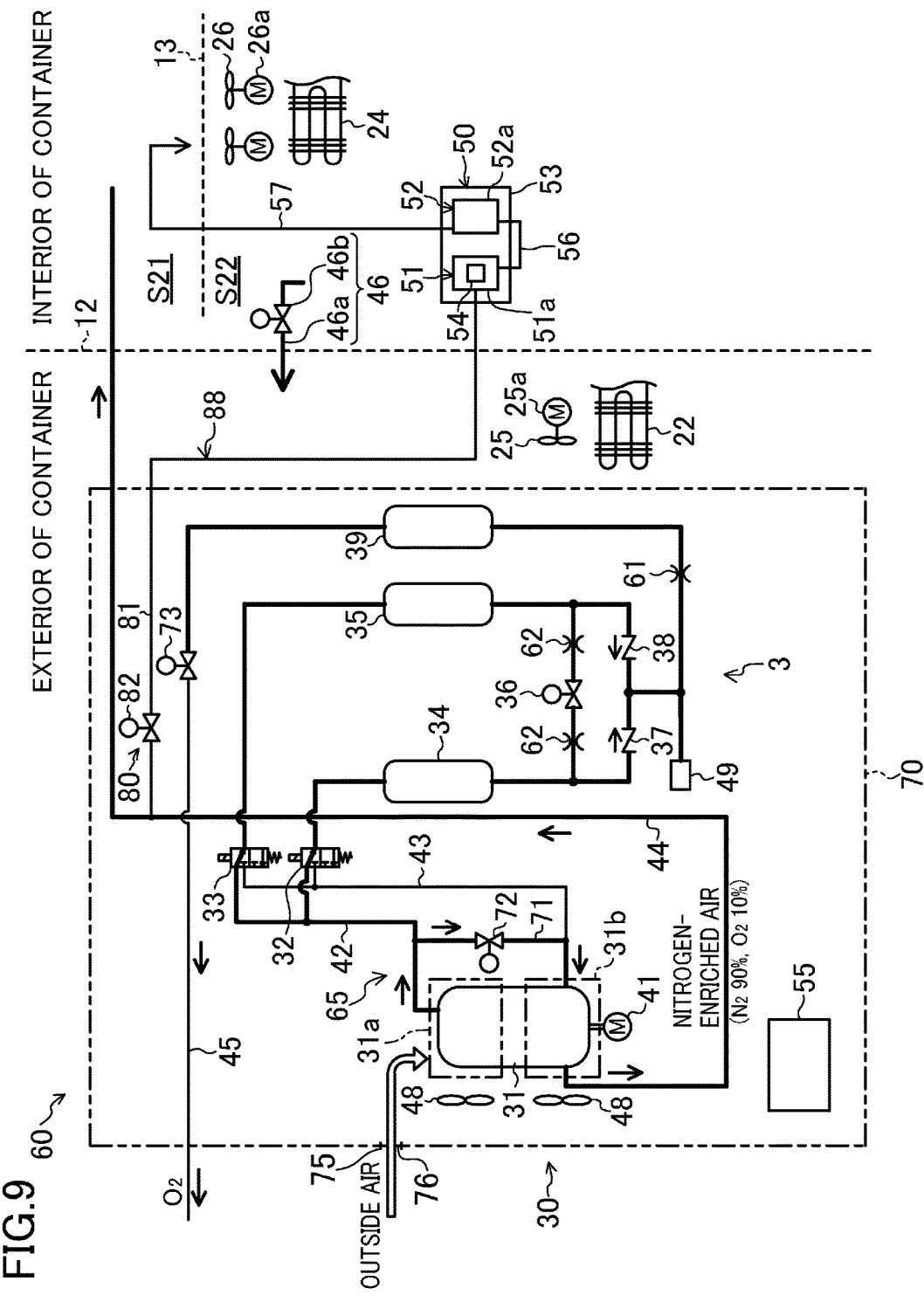
FIG. 9 is a piping system diagram illustrating a configuration of a CA system of the container refrigeration apparatus according to the second embodiment, together with an air flow in a second flow state.

As shown in FIG. 8, the CA system (60) includes a gas supply device (30), an exhaust portion (46), a sensor unit (50), a measurement unit (80), and a controller (55), and controls the oxygen concentration and carbon dioxide concentration of the air in the container (11). The term "concentration" to be used in the following description always indicates a "volumetric concentration."

[Gas Supply Device]

The gas supply device (30) produces nitrogen-enriched air with a low oxygen concentration to be supplied to the interior of the container (11), and is comprised of a vacuum pressure swing adsorption (VPSA)-type device, just like that of the first embodiment. Further, the gas supply device (30) is disposed at the lower left corner of the external storage space (S1), as shown in FIG. 5.

As shown in FIG. 8, the gas supply device (30) includes an air pump (31), first and second directional control valves (32) and (33), first and second adsorption columns (34) and (35) each provided with an adsorbent for adsorbing nitrogen in the air, an air circuit (3) connected to an oxygen tank (39), and a unit case (70) housing components of the air circuit (3). In this manner, the gas supply device (30) forms a single unit with these components housed in the unit case (70), and is configured to be attached later to the container refrigeration apparatus (10).

(Air Pump)

The air pump (31) is provided in the unit case (70), and includes first and second pumping mechanisms (31a) and (31b) each of which sucks and pressurizes the air, and discharges the pressurized air. The first and second pumping mechanisms (31a) and (31b) are connected to a driving axis of a motor (41), and are driven in rotation by a motor (41) to suck, pressurize, and discharge the air.

The first pumping mechanism (31a) has a suction port opened in the unit case (70), and an air-permeable, waterproof membrane filter (76) is fitted in an air inlet port (75) of the unit case. Thus, the first pumping mechanism (31a) sucks and pressurizes the outside air having its water vapor removed when flowing from the outside to inside of the unit case (70) through the membrane filter (76) fitted in the air inlet port (75). Further, the first pumping mechanism (31a) has a discharge port connected to one end of a discharge passage (42). The other end of the discharge passage (42) is divided into two branches on a downstream side, and the two branches are connected to the first and second directional control valves (32) and (33), respectively.

The second pumping mechanism (31b) has a suction port connected to one end of a suction passage (43). The other end of the suction passage (43) is divided into two branches on an upstream side, and the two branches are connected to the first and second directional control valves (32) and (33), respectively. Further, the second pumping mechanism (31b) has a discharge port connected to one end of a supply passage (44). The other end of the supply passage (44) opens in the first space (S21) of the internal storage space (S2) of the container (11) on the suction side of the interior fans (26).

Also in the second embodiment, the first and second pumping mechanisms (31a) and (31b) of the air pump (31) are configured as oil-less pumps without lubricant oil.

On one side of the air pump (31), two blower fans (48) blowing the air toward the air pump (31) to cool the air pump (31) are provided.

(Directional Control Valves)

The first and second directional control valves (32) and (33) are provided in the air circuit (3) between the air pump (31) and the first and second adsorption columns (34) and (35), and switch the state of connection between the air pump (31) and the first and second adsorption columns (34) and (35) to a first, second, or third state of connection. This switching operation is controlled by the controller (55).

Specifically, the first directional control valve (32) is connected to the discharge passage (42) connected to the discharge port of the first pumping mechanism (31a), the suction passage (43) connected to the suction port of the second pumping mechanism (31b), and the top of the first adsorption column (34). The first directional control valve (32) switches between a first state where the first adsorption column (34) is allowed to communicate with the discharge port of the first pumping mechanism (31a) to be blocked from the suction port of the second pumping mechanism (31b) (the state shown in FIG. 8), and a second state where the first adsorption column (34) is allowed to communicate with the suction port of the second pumping mechanism (31b) to be blocked from the discharge port of the first pumping mechanism (31a).

The second directional control valve (33) is connected to the discharge passage (42) connected to the discharge port of the first pumping mechanism (31a), the suction passage (43) connected to the suction port of the second pumping mechanism (31b), and the top of the second adsorption column (35). This second directional control valve (33) switches between a first state where the second adsorption column (35) is allowed to communicate with the suction port of the second pumping mechanism (31b) to be blocked from the discharge port of the first pumping mechanism (31a) (the state shown in FIG. 8), and a second state where the second adsorption column (35) is allowed to communicate with the discharge port of the first pumping mechanism (31a) to be blocked from the suction port of the second pumping mechanism (31b).

When both of the first and second directional control valves (32) and (33) are set to the first state, the air circuit (3) is switched to a first connection state where the discharge port of the first pumping mechanism (31a) is connected to the first adsorption column (34) and the suction port of the second pumping mechanism (31b) is connected to the second adsorption column (35). In this state, an adsorption operation of adsorbing nitrogen in the outside air onto an adsorbent is performed on the first adsorption column (34), and a desorption operation of desorbing nitrogen from an adsorbent is performed on the second adsorption column (35).

When both of the first and second directional control valves (32) and (33) are set to the second state, the air circuit (3) is switched to a second connection state where the discharge port of the first pumping mechanism (31a) is connected to the second adsorption column (35) and the suction port of the second pumping mechanism (31b) is connected to the first adsorption column (34). In this state, the adsorption operation is performed on the second adsorption column (35), and the desorption operation is performed on the first adsorption column (34).

When the first directional control valve (32) is set to the first state and the second directional control valve (33) is set to the second state, the air circuit (3) is switched to a third connection state where the discharge port of the first pumping mechanism (31a) is connected to the first adsorption column (34) and the discharge port of the first pumping mechanism (31a) is connected to the second adsorption column (35). In this state, both of the first and second adsorption columns (34) and (35) are connected to the discharge port of the first pumping mechanism (31a), so that the first pumping mechanism (31a) supplies both of the first and second adsorption columns (34) and (35) with the pressurized outside air. That is to say, the third connection state is a "pressurization-of-both-columns" state where both of the first and second adsorption columns (34) and (35) are pressurized by the first pumping mechanism (31a).

(Adsorption Columns)

The first and second adsorption columns (34) and (35) are configured as cylindrical members filled with an adsorbent, and are disposed upright (i.e., disposed such that each axis direction thereof is a vertical direction). The adsorbent that fills the first and second adsorption columns (34) and (35) may be comprised of zeolite, just like that of the first embodiment.

With this configuration, if the first and second adsorption columns (34) and (35) are pressurized by being supplied with the pressurized outside air from the air pump (31), nitrogen in the outside air is absorbed onto the adsorbent. This produces oxygen-enriched air which has a lower nitrogen concentration and a higher oxygen concentration than the outside air due to reduction of the amount of nitrogen as compared to the outside air. On the other hand, if the first and second adsorption columns (34) and (35) are depressurized by the air pump (31) sucking the air from the interior of these columns, the nitrogen adsorbed onto the adsorbent is desorbed. This produces nitrogen-enriched air which has a higher nitrogen concentration and a lower oxygen concentration due to containing more nitrogen than the outside air. In this embodiment, nitrogen-enriched air consisting of 90% nitrogen and 10% oxygen, for example, may be produced.

The respective lower ends of each of the first and second adsorption columns (34) and (35) (functioning as an outlet port during pressurization and an inlet port during depressurization) are connected to one end of an oxygen exhaust passage (45) which guides, to the exterior of the container (11), the oxygen-enriched air produced at the first and second adsorption columns (34) and (35) by a supply of the outside air pressurized by the first pumping mechanism (31a). The one end of the oxygen exhaust passage (45) branches into two passages, which are connected to the lower ends of the first and second adsorption columns (34)

and (35), respectively. The other end of the oxygen exhaust passage (45) opens outside the gas supply device (30), i.e., in the exterior of the container (11). A first check valve (37) preventing backflow of the air from the oxygen exhaust passage (45) to the first adsorption column (34) is provided for the one of the two passages of the oxygen exhaust passage (45) (being a connection passage) connected to the lower end of the first adsorption column (34). On the other hand, a second check valve (38) preventing backflow of the air from the oxygen exhaust passage (45) to the second adsorption column (35) is provided for the other passage of the oxygen exhaust passage (45) (being a connection passage) connected to the lower end of the second adsorption column (35).

The two connection passages comprising the one end of the oxygen exhaust passage (45) are connected via a purge valve (36), and an orifice (62) is provided between the purge valve (36) and each of the connection passages. The purge valve (36) is used to introduce a predetermined amount of the oxygen-enriched air from an adsorption column on the pressurization side (the first adsorption column (34) in FIG. 8) into an adsorption column on the depressurization side (the second adsorption column (35) in FIG. 8) to support release of nitrogen from the adsorbent of the adsorption columns (35, 34) on the depressurization side. The controller (55) controls an opening/closing operation of the purge valve (36).

An oxygen tank (39) is provided in a middle portion of the oxygen exhaust passage (45), and an orifice (61) is provided between the oxygen tank (39) and the first and second check valves (37) and (38). The oxygen tank (39) temporarily retains oxygen-enriched air produced in the first and second adsorption columns (34) and (35). The oxygen-enriched air produced in the first and second adsorption columns (34) and (35) is depressurized by the orifice (61), and is then temporarily retained in the oxygen tank (39).

In addition, a pressure sensor (49) which measures the pressure of pressurized air (high-pressure in the air circuit (3)) supplied to the first and second adsorption columns (34) and (35) by the first pumping mechanism (31a) is connected to the oxygen exhaust passage (45) between the orifice (61) and the first and second check valves (37) and (38).

(Flow Switching Mechanism)

The air circuit (3) includes a flow switching mechanism (65) which switches the state of flow of the air in the air circuit (3) between a first flow state where nitrogen-enriched air produced in the first and second adsorption columns (34) and (35) is supplied to into the container (11) by the air pump (31), and a second flow state where the outside air taken into the air circuit (3) is supplied into the container (11) by the air pump (31).

In this embodiment, the flow switching mechanism (65) includes a bypass passage (71), a bypass on-off valve (72), and an exhaust passage on-off valve (73). The bypass passage (71) connects the discharge passage (42) and the suction passage (43). The bypass on-off valve (72) is provided for the bypass passage (71). The exhaust passage on-off valve (73) is provided for the oxygen exhaust passage (45) to be closer to the outside of the gas supply device (30) than the oxygen tank (39), i.e., closer to the exterior of the container (11).

The controller (55) controls the opening/closing of the bypass on-off valve (72) and the exhaust passage on-off valve (73). Specific opening/closing operation will be described later. The air flow state of the air circuit (3) is switched to the first flow state (the state shown in FIG. 8) when the controller (55) closes the bypass on-off valve (72) and opens the exhaust passage on-off valve (73). In contrast, the air flow state of the air circuit (3) is switched to the second flow state (the state shown in FIG. 9) when the controller (55) opens the bypass on-off valve (72) and closes the exhaust passage on-off valve (73).

In the second embodiment, with the air flow state of the air circuit (3) switched to the first flow state (the state shown in FIG. 8), the gas supply device (30) is switched to a first supply state where nitrogen-enriched air produced from the outside air in the first and second first adsorption columns (34) and (35) is supplied as supply air via the supply passage (44) to the interior of the container (11). On the other hand, with the air flow state of the air circuit (3) switched to the second flow state (the state shown in FIG. 9), the gas supply device (30) is switched to a second supply state where the outside air is taken in, and is supplied as supply air via the supply passage (44) to the interior of the container (11).

Operation of Gas Supply Device

The gas supply device (30) switches between the first supply state where the nitrogen-enriched air produced from the outside air is supplied as the supply air to the interior of the container (11), and the second supply state where the outside air is taken in and supplied as the supply air to the interior of the container (11).

<<Operation in First Supply State>>

The controller (55) switches the air flow state of the air circuit (3) to the first flow state, thereby switching the gas supply device (30) to the first supply state.

Specifically, the controller (55) activates the air pump (31) with the bypass on-off valve (72) closed and the exhaust passage on-off valve (73) opened. Then, the controller (55) operates the first and second directional control valves (32) and (33) such that the state of connection between the air pump (31) and the first and second adsorption columns (34) and (35) is switched alternately between the first and second connection states at predetermined time intervals (e.g., every 15 seconds). In the first connection state, a first operation of pressurizing the first adsorption column (34) to depressurize the second adsorption column (35) at the same time is performed. In the second connection state, on the other hand, a second operation of depressurizing the first adsorption column (34) to pressurize the second adsorption column (35) at the same time is performed.

<<First Operation>>

During the first operation, the controller (55) switches both of the first and second directional control valves (32) and (33) to the first state shown in FIG. 8. As a result, the air circuit (3) enters the first connection state where the first adsorption column (34) communicates with the discharge port of the first pumping mechanism (31a) to be blocked from the suction port of the second pumping mechanism (31b), and the second adsorption column (35) communicates with the suction port of the second pumping mechanism (31b) to be blocked from the discharge port of the first pumping mechanism (31a).

The first pumping mechanism (31a) supplies the pressurized outside air to the first adsorption column (34). Nitrogen contained in the air flowed into the first adsorption column (34) is adsorbed onto the adsorbent of the first adsorption column (34). Thus, during the first operation, the first adsorption column (34) is supplied with the pressurized outside air from the first pumping mechanism (31a) and nitrogen in the outside air is adsorbed onto the adsorbent. This produces oxygen-enriched air having a lower nitrogen concentration and a higher oxygen concentration than the outside air. The oxygen-enriched air flows from the first adsorption column (34) into the oxygen exhaust passage (45).

On the other hand, the second pumping mechanism (31b) sucks the air from the second adsorption column (35). In that case, nitrogen adsorbed onto the adsorbent of the second adsorption column (35) is desorbed from the adsorbent by being sucked together with the air by the second pumping mechanism (31b). Thus, during the first operation, the nitrogen adsorbed onto the absorbent is desorbed as the air in the second adsorption column (35) is sucked by the second pumping mechanism (31b). This produces nitrogen-enriched air including the nitrogen desorbed from the adsorbent and having a higher nitrogen concentration and a lower oxygen concentration than the outside air. The nitrogen-enriched air is sucked into the second pumping mechanism (31b), pressurized, and then discharged to the supply passage (44).

<<Second Operation>>

During the second operation, the controller (55) switches both of the first and second directional control valves (32) and (33) to the second state opposite to the state shown in FIG. 8. As a result, the air circuit (3) enters the second connection state where the first adsorption column (34) communicates with the suction port of the second pumping mechanism (31b) to be blocked from the discharge port of the first pumping mechanism (31a), and the second adsorption column (35) communicates with the discharge port of the first pumping mechanism (31a) to be blocked from the suction port of the second pumping mechanism (31b).

The first pumping mechanism (31a) supplies the pressurized outside air to the second adsorption column (35). Nitrogen contained in the air flowed into the second adsorption column (35) is adsorbed onto the adsorbent of the second adsorption column (35). Thus, during the second operation, the second adsorption column (35) is supplied with the pressurized outside air from the first pumping mechanism (31a) and nitrogen in the outside air is adsorbed onto the adsorbent. This produces oxygen-enriched air having a lower nitrogen concentration and a higher oxygen concentration than the outside air. The oxygen-enriched air flows from the second adsorption column (35) into the oxygen exhaust passage (45).

On the other hand, the second pumping mechanism (31b) sucks the air from the first adsorption column (34). In that case, nitrogen adsorbed onto the adsorbent of the first adsorption column (34) is desorbed from the adsorbent by being sucked together with the air by the second pumping mechanism (31b). Thus, during the second operation, the nitrogen adsorbed onto the adsorbent is desorbed as the air in the first adsorption column (34) is sucked by the second pumping mechanism (31b). This produces nitrogen-enriched air including the nitrogen desorbed from the adsorbent and having a higher nitrogen concentration and a lower oxygen concentration than the outside air. The nitrogen-enriched air is sucked into the second pumping mechanism (31b), pressurized, and then discharged to the supply passage (44).

In this manner, the gas supply device (30) repeats the first and second operations alternately to produce the nitrogen-enriched air and the oxygen-enriched air in the air circuit (3). In the first flow state, the bypass on-off valve (72) is closed and the exhaust passage on-off valve (73) is open. Thus, the oxygen-enriched air produced in the first and second adsorption columns (34) and (35) is exhausted via the oxygen exhaust passage (45) out of the container (11) due to pressurization pressure applied by the first pumping mechanism (31a) of the air pump (31), while the nitrogen-enriched air produced in the first and second adsorption columns (34) and (35) is supplied via the supply passage (44) into the container (11) due to pressurization pressure applied by the second pumping mechanism (31b) of the air pump (31).

As can be seen from the foregoing, a gas supply operation of supplying the nitrogen-enriched air produced in the first and second adsorption columns (34) and (35) into the container (11) is performed in the first flow state. That is to say, the gas supply device (30) enters the first supply state where the nitrogen-enriched air produced from the outside air is supplied as the supply air via the supply passage (44) to the interior of the container (11).

<<Operation in Second Supply State>>

The controller (55) switches the air flow state of the air circuit (3) to the second flow state, thereby switching the gas supply device (30) to the second supply state.

Specifically, with the bypass on-off valve (72) opened and the exhaust passage on-off valve (73) closed, the controller (55) operates the first and second directional control valves (32) and (33) to switch the state of connection between the air pump (31) and the first and second adsorption columns (34) and (35) to the third connection state where both of the first and second adsorption columns (34) and (35) are connected to the discharge port of the first pumping mechanism (31a) (a "both-column-pressurized" state). Then, the air pump (31) is activated.

In the second flow state, the first pumping mechanism (31a) supplies the pressurized outside air to both of the first and second adsorption columns (34) and (35), so that both of the first and second adsorption columns (34) and (35) perform the adsorption operation to produce the oxygen-enriched air.

Further, in the second flow state, the bypass on-off valve (72) is opened, and the exhaust passage on-off valve (73) is closed. Thus, even if the first and second adsorption columns (34) and (35) are supplied with the pressurized outside air to produce the oxygen-enriched air, the oxygen-enriched air thus produced is not discharged outside (to the exterior of the container (11)). Therefore, as soon as the flow state is switched to the second flow state, an internal pressure between a junction between the discharge passage (42) and the bypass passage (71) and the exhaust passage on-off valve (73) of the oxygen exhaust passage (45) increases so much that the outside air pressurized by the first pumping mechanism (31a) does no longer flow toward the first and second adsorption columns (34) and (35).

As a result, the outside air pressurized by the first pumping mechanism (31a) flows from the discharge passage (42) into the bypass passage (71), bypasses the first and second adsorption columns (34) and (35) to flow into the suction passage (43), and is sucked into the second pumping mechanism (31b). That is to say, the outside air pressurized by the first pumping mechanism (31a) is sucked as it is into the second pumping mechanism (31b). Then, the outside air sucked into the second pumping mechanism (31b) is pressurized, and supplied via the supply passage (44) into the container (11).

As can be seen from the foregoing, in the second flow state, an outside air introduction operation of supplying the outside air taken in the air circuit (3) as it is into the container (11) by the pressurization pressure applied by the second pumping mechanism (31b) of the air pump (31). That is to say, the gas supply device (30) enters the second supply state where the outside air taken therein is supplied as the supply air to the interior of the container (11) via the supply passage (44).

[Exhaust Portion]

As shown in FIG. 6, the exhaust portion (46) includes an exhaust passage (46a) connecting the internal storage space (S2) and the external space of the container, and an exhaust valve (46b) connected to the exhaust passage (46a). The exhaust passage (46a) is provided to penetrate the casing (12) so that the internal and external spaces of the container communicate with each other. The exhaust valve (46b) is provided for the exhaust passage (46a) in the interior of the container, and is comprised of an electromagnetic valve switching between an open state where the air is allowed to flow through the exhaust passage (46a), and a closed state where the flow of air in the exhaust passage (46a) is blocked. The controller (55) controls the opening/closing operation of the exhaust valve (46b).

While the interior fans (26) are rotating, the controller (55) opens the exhaust valve (46b) so as to perform an exhaust operation of exhausting the air in the internal storage space (S2) communicating with the interior of the container (air in the container) to the exterior of the container.

Specifically, when the interior fans (26) are rotating, the pressure in the second space (S22) on the blowout side of the fans becomes higher than the pressure in the external space of the container (atmospheric pressure). As a result, when the exhaust valve (46b) is open, the air in the internal storage space (S2) communicating with the interior of the container (the air in the container) is exhausted via the exhaust passage (46a) to the external space of the container due to the pressure difference between the two ends of the exhaust passage (46a) (pressure difference between the external space of the container and the second space (S22)).

[Sensor Unit]

As shown in FIG. 6, the sensor unit (50) is provided in the second space (S22) which is on the blowout side of the interior fans (26) in the internal storage space (S2). As shown in FIG. 5, the sensor unit (50) is attached to an upper portion of an inner surface of the casing (12) between the two access openings (14), to which the first and second access doors (16A) and (16B) are attached, respectively.

Figure 10:
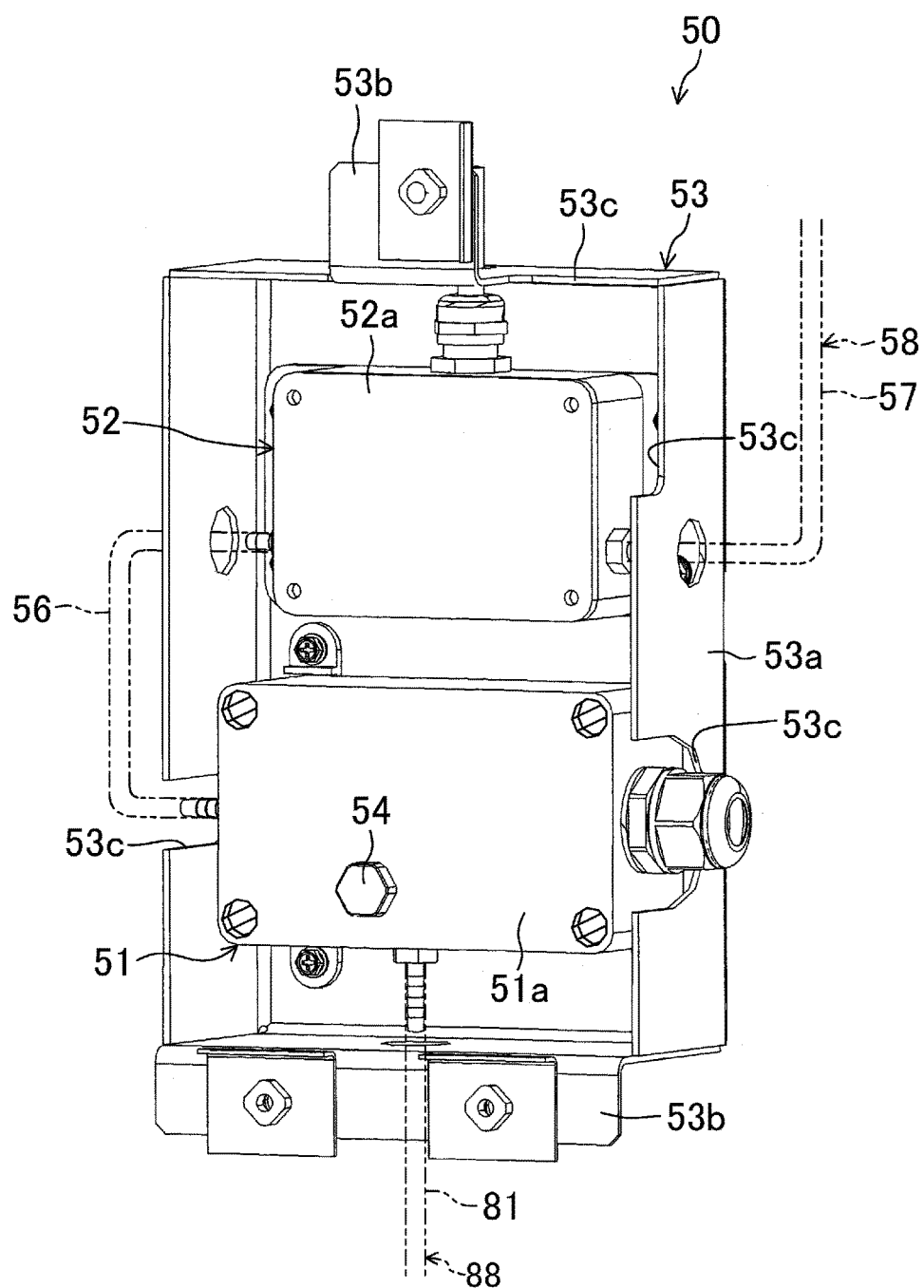
FIG. 10 is a perspective view illustrating a sensor unit of the container refrigeration apparatus according to the second embodiment.

As shown in FIG. 10, the sensor unit (50) includes the oxygen concentration sensor (51), the carbon dioxide concentration sensor (52), a fixing member (53), a membrane filter (54), a connection pipe (56), and an exhaust pipe (57).

The oxygen concentration sensor (51) has an oxygen sensor box (51a) housing a galvanic-cell sensor therein. The oxygen concentration sensor (51) measures the value of a current flowing through an electrolytic solution of the galvanic cell-type sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54) is attached.

The membrane filter (54) is an air-permeable, waterproof filter. This membrane filter (54) allows the second space (S22) of the internal storage space (S2) to communicate with the internal space of the oxygen sensor box (51a), and prevents, when the air in the container passes from the second space (S22) to the internal space of the oxygen sensor box (51a), moisture in the air from entering the internal space.

Further, a branch pipe (81) of a measurement unit (80), which will be described later, is coupled via a connector (pipe joint) to a lower surface of the oxygen sensor box (51a). In addition, the connection pipe (56) is coupled via a connector to one of the side surfaces of the oxygen sensor box (51a).

The carbon dioxide concentration sensor (52) has a carbon dioxide sensor box (52a). The carbon dioxide concentration sensor (52) is a non-dispersive infrared sensor which radiates infrared rays to the gas in the carbon dioxide sensor box (52a) to measure an absorption amount of infrared rays having a wavelength specific to carbon dioxide, thereby measuring the carbon dioxide concentration in the gas. The connection pipe (56) is coupled to via a connector one side surface of the carbon dioxide sensor box (52a). Furthermore, the exhaust pipe (57) is coupled via a connector to the other side surface of the carbon dioxide sensor box (52a).

The fixing member (53) includes a box-shaped body (53a) with one face open, and a fixing part (53b) which extends outward from an outer edge of the body (53a) along the open face and is bolted to the casing (12). A plurality of notches (53c) that allow the interior and exterior of the body (53a) to communicate with each other are formed through three of the side faces surrounding the open face of the body (53a). The oxygen sensor box (51a) and the carbon dioxide sensor box (52a) are fixed to the face of the body (53a) opposite to the open face. The fixing member (53) is fixed to the casing (12) with the oxygen concentration sensor (51) and the carbon dioxide concentration sensor (52) attached thereto.

According to this configuration, the internal space of the fixing member (53) communicates with the second space (S22) on the blowout side of the interior fans (26) through the plurality of notches (53c), while blocking the flow of the air blown from the interior fans (26). In other words, the fixing member (53) comprises a blocking member forming a blocked region in the second space (S22) where the flow of air blown from the interior fans (26) is blocked.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

Further, as described above, the exhaust pipe (57) has one end coupled to the other side face of the carbon dioxide sensor box (52a), and the other end open near the suction port of the interior fans (26). That is, the exhaust pipe (57) allows the internal space of the carbon dioxide sensor box (52a) to communicate with the first space (S21) of the internal storage space (S2).

As can be seen, the internal space of the oxygen sensor box (51a) and the internal space of the carbon dioxide sensor box (52a) communicate with each other via the connection pipe (56), the internal space of the oxygen sensor box (51a) communicates with the second space (S22) of the internal storage space (S2) via the membrane filter (54), and the internal space of the carbon dioxide sensor box (52a) communicates with the first space (S21) of the internal storage space (S2) via the exhaust pipe (57). That is, the second and first spaces (S22) and (S21) of the internal storage space (S2) communicate with each other via the membrane filter (54), the internal space of the oxygen sensor box (51a), the connection pipe (56), the internal space of the carbon dioxide sensor box (52a), and the air passage (58) formed by the exhaust pipe (57). In other words, the oxygen concentration sensor (51) and the carbon dioxide concentration sensor (52) are connected to the air passage (58) which allows the first and second spaces (S21) and (S22) of the internal storage space (S2) to communicate with each other. Thus, in the sensor unit (50), when the interior fans

(26) are rotating, the air in the container flows from the inlet (the membrane filter (54)) to outlet (the outlet end of the exhaust pipe (57)) of the air passage (58), and then the oxygen concentration and the carbon dioxide concentration are measured.

Specifically, when the interior fans (26) are rotating, the pressure of the first space (S21) on the suction side of the fans becomes lower than the pressure of the second space (S22) on the blowout side of the fans. Thus, when the interior fans (26) are rotating, due to the pressure difference between the first and second spaces (S21) and (S22), the air in the container flows from the second space (S22) toward the first space (S21) in the air passage (58) to which the oxygen concentration sensor (51) and the carbon dioxide concentration sensor (52) are connected. More particularly, first, the air in the second space (S22) flows via the membrane filter (54) into the internal space of the oxygen sensor box (51a), passes through the connection pipe (56), the internal space of the carbon dioxide sensor box (52a), and the exhaust pipe (57) in this order, and is discharged to the second space (S22). In this manner, the air in the container passes through the oxygen concentration sensor (51) and the carbon dioxide concentration sensor (52) in this order, and thus, the oxygen concentration sensor (51) measures the oxygen concentration of the air in the container, and the carbon dioxide concentration sensor (52) measures the carbon dioxide concentration of the air in the container.

[Measurement Unit]

The measurement unit (80) includes a measurement passage (88) and a measurement on-off valve (82), and is configured to diverge, and guide to the oxygen concentration sensor (51), part of nitrogen-enriched air produced in the gas supply device (30) and passing through the supply passage (44).

Specifically, the measurement passage (88) is comprised of a branch pipe (81) that diverges, and guides to the air passage (58), part of nitrogen-enriched air passing through the supply passage (44), just like in the first embodiment. The branch pipe (81) has one end connected to the supply passage (44) in the unit case (70), and the other end coupled to the oxygen sensor box (51a) of the oxygen concentration sensor (51). According to this configuration, the branch pipe (81) allows the supply passage (44) to communicate with the internal space of the oxygen sensor box (51a). The branch pipe (81) is branched from the supply passage (44) in the unit case (70) and extends from the interior to the exterior of the unit case.

The measurement on-off valve (82) is provided for the branch pipe (81) in the unit case (70). The measurement on-off valve (82) is comprised of an electromagnetic valve switching between an open state where the flow of nitrogen-enriched air in the branch pipe (81) is allowed, and a closed state where the flow of the nitrogen-enriched air in the branch pipe (81) is blocked. The opening/closing operation of the measurement on-off valve (82) is controlled by the controller (55).

[Controller]

Figure 11:
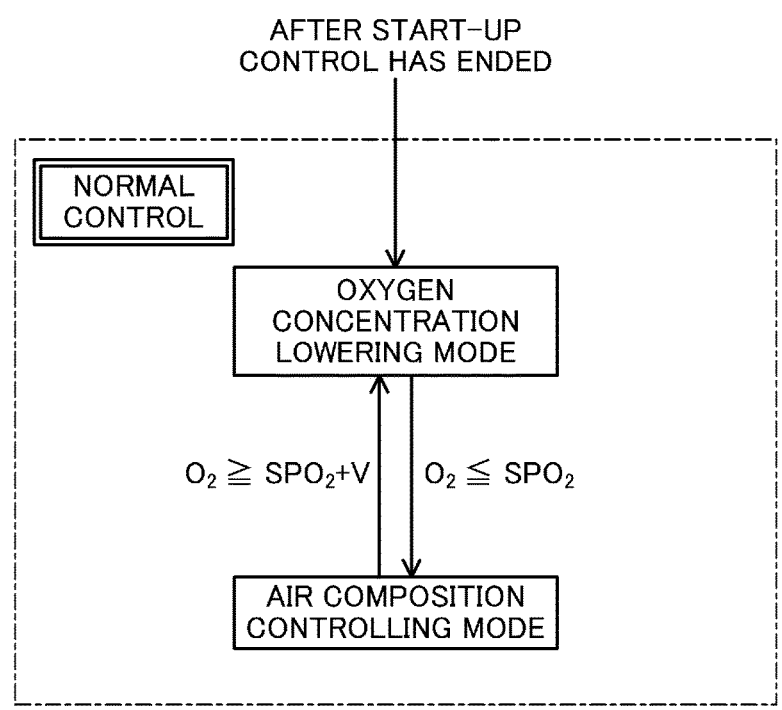
FIG. 11 is a diagram illustrating how the mode of a concentration control operation according to the second embodiment changes under normal control.
Figure 12:
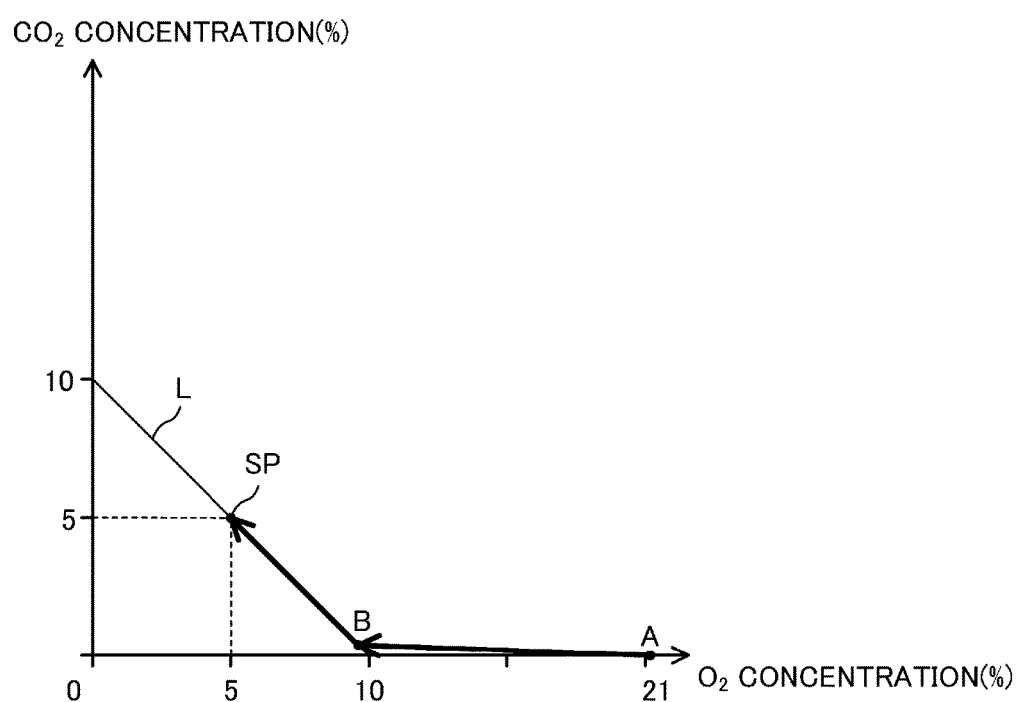
FIG. 12 is a graph illustrating how the composition of the air in the container changes during the concentration control operation in the container refrigeration apparatus according to the second embodiment.

The controller (55) is configured to perform a concentration control operation of controlling the oxygen concentration and carbon dioxide concentration of the air in the container (11) to desired concentrations, respectively. Specifically, the controller (55) controls the operation of the gas supply device (30) and exhaust portion (46) based on measurement results obtained by the oxygen concentration sensor (51) and the carbon dioxide concentration sensor (52) so that the composition of the air in the container (11) (oxygen concentration and carbon dioxide concentration) is controlled to a desired composition (e.g., 5% oxygen and 5% carbon dioxide). As shown in FIG. 11, in this embodiment, the controller (55) is configured to perform the concentration control operation by executing start-up control and normal control. Further, the controller (55) is configured to perform normal control after the predetermined start-up control has ended, and to perform control in an oxygen concentration lowering mode or an air composition controlling mode during the normal control.

In addition, the controller (55) is configured to control the operation of the measurement on-off valve (82) in accordance with a command entered by a user or periodically so as to perform a supply air measurement operation of measuring the oxygen concentration of the nitrogen-enriched air produced by the gas supply device (30).

Operations

<Operation of Refrigerant Circuit>

[Cooling Operation]

In this embodiment, a unit controller (100) shown in FIG. 7 performs a cooling operation of cooling the air in the container (11).

During the cooling operation, the unit controller (100) controls the operation of the compressor (21), the expansion valve (23), the exterior and interior fans (25) and (26) based on the measurement result of a temperature sensor (not shown) so that the temperature of the air in the container reaches a desired target temperature. In this case, the refrigerant circuit (20) allows the refrigerant to circulate to perform a vapor compression refrigeration cycle. Then, the air in the container (11) guided to the internal storage space (S2) by the interior fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

[Defrosting Operation]

Further, in this embodiment, at a predetermined timing when it is assumed that frost is formed on the evaporator (24), the unit controller (100) performs, during the cooling operation, a defrosting operation of defrosting the evaporator (24) by heating it.

In this embodiment, as an exemplary defrosting operation, a defrosting operation of heating the evaporator (24) with an electric heater (not shown) is performed. In this case, the unit controller stops the rotation of the exterior and interior fans (25) and (26). As the evaporator (24) is heated with the electric heater, frost attached to the evaporator (24), e.g., fins and tubes thereof, melts and eventually evaporates. In this manner, the evaporator (24) is defrosted. Note that the defrosting operation may be performed in any way as long as the evaporator (24) is defrosted by heating. For example, if the refrigerant circuit (20) is configured to have a switching valve so that the refrigerant circulates reversibly, a so-called reverse-cycle defrosting operation may be performed in which the refrigerant circulates in the refrigerant circuit (20) in a direction opposite to the direction during the cooling operation. In that case, in the refrigerant circuit (20), a high-pressure refrigerant compressed by the compressor (21) is supplied to the evaporator (24), and frost attached to the evaporator (24), e.g., fins and tubes thereof, melts as it absorbs heat from the high-pressure refrigerant, and eventually evaporates. Thus, the evaporator (24) is defrosted.

<Concentration Control Operation>

Further, in this embodiment, the controller (55) shown in FIG. 8 instructs the CA system (60) to perform a concentration control operation of controlling the composition of the air in the container (11) (oxygen concentration and carbon dioxide concentration) to a desired composition (e.g., 5% oxygen and 5% carbon dioxide) based on the measurement results obtained by the oxygen concentration sensor (51) and the carbon dioxide concentration sensor (52). The controller (55) performs the concentration control operation by executing start-up control and normal control. During the normal control, the controller (55) performs the control in an oxygen concentration lowering mode or an air composition controlling mode so as to control the oxygen concentration and carbon dioxide concentration of the air in the container (11) to desired target concentrations SP, respectively.

During the concentration control operation, the controller (55) instructs the measurement on-off valve (82) to close. Further, during the concentration control operation, the controller (55) communicates with the unit controller (100) and instructs the unit controller (100) to rotate the interior fans (26). As a result, the oxygen concentration sensor (51) and the carbon dioxide concentration sensor (52) receive the air in the container sent from the interior fans (26), and measure the oxygen concentration and carbon dioxide concentration of the air in the container.

Specifically, as shown in FIG. 11, the controller (55) performs the control in the oxygen concentration lowering mode during the normal control after the start-up control has ended. Then, if the oxygen concentration of the air in the container (11) measured by the oxygen concentration sensor (51) is lowered to the target oxygen concentration $SPO_2$ (5% in this embodiment), the controller (55) finishes the control in the oxygen concentration lowering mode and starts the control in the air composition controlling mode. In the air composition controlling mode, if the oxygen concentration of the air in the container (11) measured by the oxygen concentration sensor (51) reaches or exceeds a certain concentration (6.0% in this embodiment), which is the sum of the target oxygen concentration $SPO_2$ (5% in this embodiment) and a predetermined concentration V (1.0% in this embodiment), the controller (55) finishes the control in the air composition controlling mode and returns to the oxygen concentration lowering mode. The oxygen concentration lowering mode and air composition controlling mode under the normal control will be described in detail below.

[Oxygen Concentration Lowering Mode]

In the oxygen concentration lowering mode, first, the controller (55) switches the air circuit (3) to the first flow state, and performs a gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the oxygen concentration of the air in the container is lowered (from point A to point B in FIG. 12).

When the sum of the oxygen concentration and carbon dioxide concentration of the air in the container (11) reaches the sum of the target concentrations, i.e., the sum of the target oxygen concentration $SPO_2$ and the target carbon dioxide concentration $SPCO_2$ (reaches the point B in FIG. 12), the controller (55) stops the gas supply operation and the exhaust operation.

When the gas supply operation and the exhaust operation are stopped, the air in the container (11) is no longer replaced. Therefore, the composition of the air in the container changes only due to the respiration of the plants (15). Through the respiration, the plants (15) take oxygen in, and release the same volume of carbon dioxide as the oxygen taken in. Thus, as the plants (15) respire, the oxygen concentration of the air in the container (11) decreases, and the carbon dioxide concentration increases by the amount of decrease of the oxygen concentration, with the sum of the oxygen concentration and carbon dioxide concentration of the air in the container remaining unchanged. Thus, after the gas supply operation and the exhaust operation have been stopped, the composition of the air in the container (11) changes, as a result of the respiration of the plants (15), along the straight line L having an inclination of −1 and passing the target composition point SP (where the oxygen concentration is 5% and the carbon dioxide concentration is 5%) in a direction in which the oxygen concentration decreases and the carbon dioxide concentration increases. That is to say, after the gas supply operation and the exhaust operation have been stopped at an arbitrary point on the straight line L, the composition of the air in the container (11) may then be controlled to the target composition only by making use of the respiration of the plants (15).

Thereafter, when the oxygen concentration of the air in the container decreases to the target oxygen concentration $SPO_2$ (5% in this embodiment) or lower, the controller (55) finishes the control in the oxygen concentration lowering mode, and starts the control in the air composition controlling mode.

[Air Composition Controlling Mode]

<<Control of Oxygen Concentration>>

In the air composition controlling mode, the controller (55) performs an oxygen concentration increasing control of increasing the oxygen concentration of the air in the container if the oxygen concentration of the air in the container falls below a lower limit value (4.5% in this embodiment), which is lower than the target oxygen concentration $SPO_2$ (5% in this embodiment) only by the predetermined concentration X (0.5% in this embodiment).

In the oxygen concentration increasing control, the controller (55) switches the air circuit (3) to the second flow state, and performs an outside air introduction operation of supplying the outside air taken into the air circuit (3) to the interior of the container (11). Simultaneously, the controller (55) instructs the exhaust valve (46b) of the exhaust portion (46) to open to perform the exhaust operation, so that the air in the container is exhausted out of the container only by the amount of the outside air supplied to the interior of the container (11) during the outside air introduction operation. Through the outside air introduction operation and the exhaust operation thus performed, the air in the container is replaced with the outside air, and thus, the oxygen concentration of the air in the container (11) increases.

If the oxygen concentration of the air in the container reaches or exceeds a certain value (5.5% in this embodiment) which is higher than the target oxygen concentration $SPO_2$ (5% in this embodiment) only by the predetermined concentration X (0.5% in this embodiment), the controller (55) stops the outside air introduction operation and the exhaust operation. Thus, the oxygen concentration increasing control ends.

<<Control of Carbon Dioxide Concentration>>

Further, in the air composition controlling mode, the controller (55) performs carbon dioxide concentration lowering control to lower the carbon dioxide concentration of the air in the container if the carbon dioxide concentration of the air in the container reaches or exceeds an upper limit value (5.5% in this embodiment), which is higher than the target carbon dioxide concentration $SPCO_2$ (5% in this embodiment) only by the predetermined concentration Y (0.5% in this embodiment).

During the carbon dioxide concentration lowering control, the controller (55) first switches the air circuit (3) to the first flow state, and performs the gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform the exhaust operation, so that the air in the container is exhausted out of the container only by the amount of the nitrogen-enriched air supplied to the interior of the container (11) during the gas supply operation. Through the gas supply operation and the exhaust operation thus performed, the air in the container is replaced with the nitrogen-enriched air. Thus, the carbon dioxide concentration of the air in the container (11) is lowered.

If the carbon dioxide concentration of the air in the container falls below a certain value (4.5% in this embodiment) which is lower than the target carbon dioxide concentration $SPCO_2$ (5% in this embodiment) only by the predetermined concentration Y (0.5% in this embodiment), the controller (55) stops the gas supply operation and the exhaust operation, and ends the carbon dioxide concentration lowering control.

Note that, in the carbon dioxide concentration lowering control, the gas supply operation may be replaced with the outside air introduction operation of supplying the outside air taken into the air circuit (3) to the interior of the container (11) with the air circuit (3) switched to the second flow state.

[Supply Air Measurement Operation]

Further, the controller (55) performs a supply air measurement operation of measuring the oxygen concentration of the nitrogen-enriched air produced in the gas supply device (30) in accordance with a command entered by a user or periodically (e.g., every ten days). Note that the supply air measurement operation is performed concurrently when the interior fans (26) are stopped during a gas supply operation for the concentration control operation described above or test run.

Specifically, the controller (55) instructs the measurement on-off valve (82) to open during the gas supply operation, i.e., in the first supply state where the gas supply device (30) supplies the nitrogen-enriched air produced from the outside air in the first and second adsorption columns (34) and (35) to the interior of the container (11). When the measurement on-off valve (82) is opened during the gas supply operation, part of the nitrogen-enriched air passing through the supply passage (44) flows into the branch pipe (81). The nitrogen-enriched air that flowed into the branch pipe (81) flows into the oxygen sensor box (51a) comprising part of the air passage (58), and thus, the oxygen concentration sensor (51) measures the oxygen concentration.

Thus, during the supply air measurement operation, part of the nitrogen-enriched air passing through the supply passage (44) is guided via the branch pipe (81) to the oxygen concentration sensor (51). As a result, the oxygen concentration of the nitrogen-enriched air produced in the gas supply device (30) is measured by the oxygen concentration sensor (51) provided to measure the oxygen concentration of the air in the container. In addition, if the oxygen concentration of the nitrogen-enriched air produced in the gas supply device (30) is measured in this way, it may be determined whether or not the composition of the nitrogen-enriched air produced in the gas supply device (30) (oxygen concentration and nitrogen concentration) is in a desired state (consisting of 90% nitrogen and 10% oxygen, for example).

Note that the nitrogen-enriched air that passed through the oxygen concentration sensor (51) also passes through the carbon dioxide concentration sensor (52). Thus, during the supply air measurement operation, the carbon dioxide concentration of the nitrogen-enriched air may be measured by the carbon dioxide concentration sensor (52) so as to calibrate the carbon dioxide concentration sensor (52). That is, the nitrogen-enriched air is produced by replacing part of the oxygen in the outside air (consisting of 0.03% carbon dioxide) with nitrogen, and thus, has approximately the same carbon dioxide concentration as the outside air. Therefore, if the setting is corrected such that the carbon dioxide concentration of the nitrogen-enriched air measured by the carbon dioxide concentration sensor (52) would be 0.03%, the carbon dioxide concentration sensor (52) may be calibrated.

During the defrosting operation, the evaporator (24) is heated to melt and evaporate frost attached thereto. Thus, the air in the container around the evaporator (24) contains a high amount of water vapor. The evaporator (24) is provided on the blowout side of the fans (26) where one end of the air passage (58) provided with the oxygen concentration sensor (51) opens. Further, since the unit controller (100) stops the rotation of the fans (26) during the defrosting operation, the air in the container (11) does not flow through the air passage (58). Therefore, if nothing is done during the defrosting operation, the air in the container around the evaporator (24) containing a high amount of water vapor enters the air passage (58), and may possibly cause condensation inside the air passage (58). The condensation, if occurring inside the air passage (58), may cause a malfunction of the oxygen concentration sensor (51) provided for the air passage (58), or block the flow of the air.

Thus, according to this embodiment, the controller (55) is configured to perform the supply air measurement operation at any rate during the defrosting operation. In this configuration, part of the nitrogen-enriched air produced by the gas supply device (30) is supplied forcibly to the air passage (58) during the defrosting operation. Thus, the air in the container around the evaporator (24) containing a high amount of water vapor does not enter, or condense in, the air passage (58).

As can be seen from the foregoing, the second embodiment may also achieve the same advantages as the first embodiment.

Other Embodiments

The above-described embodiments may be modified in the following manner.

The controller (55) may perform the supply air measurement operation periodically, and store the oxygen concentration of the nitrogen-enriched air thus measured. In such a case, whether or not a malfunction has occurred in the gas supply device (30) may be determined from the variation in oxygen concentration of the nitrogen-enriched air with time.

In the embodiments described above, the air pump (31) has the first and second pumping mechanisms (31a) and (31b), and the second pumping mechanism (31b) of the air pump (31) sucks nitrogen-enriched gas. However, a suction pump sucking the nitrogen-enriched gas may be provided separately, for example.

Also, although two adsorption columns, namely, the first and second adsorption columns (34) and (35), are used to adsorb/desorb nitrogen in the embodiments described above, the number of the adsorption columns to use is not particularly limited. For example, six adsorption columns may be used as well.

Further, in the first embodiment, the nitrogen-enriched air is supplied into the container (11) to reduce the oxygen concentration of the air in the container (11) to the oxygen concentration of the nitrogen-enriched air (consisting of 10% oxygen). However, the supply of the nitrogen-enriched air may be stopped after the oxygen concentration has been reduced to the vicinity of the oxygen concentration of the nitrogen-enriched air (consisting of, for example, 12% oxygen).

Moreover, the embodiments have just been described as examples of a gas supply device (30) of the present invention applied to a container refrigeration apparatus (10) provided for a container (11) for use in marine transportation. However, use of the gas supply device (30) of the present invention is not limited to them. The gas supply device (30) of the present invention may be used to control the composition of the air in a container, such as, in addition to containers for use in marine transportation, containers for use in land transportation, simple refrigerated/cold stockrooms, and normal temperature stock rooms.

INDUSTRIAL APPLICABILITY

As can be seen from the foregoing, the present invention is useful for a container refrigeration apparatus which includes a gas supply device producing nitrogen-enriched air and controls the oxygen concentration in the air in the container.

DESCRIPTION OF REFERENCE CHARACTERS

3 Air Circuit
10 Container Refrigeration Apparatus
11 Container
20 Refrigerant Circuit
24 Evaporator
26 Interior Fan (Fan)
30 Gas Supply Device
31a First Pumping Mechanism
31b Second Pumping Mechanism
44 Supply Passage
55 Controller
51 Oxygen Concentration Sensor
52 Carbon Dioxide Concentration Sensor
81 Branch Pipe
82 Measurement On-Off Valve (On-Off Valve)
83 Calibration Gas Introduction Mechanism
88 Measurement Passage
58 Air Passage
100 Unit Controller

The invention claimed is:

1. A container refrigeration apparatus provided in a container, having a refrigerant circuit where a refrigerant circulates to perform a refrigeration cycle, and allowing heat exchange in an evaporator connected to the refrigerant circuit between air in the container and the refrigerant to cool the air, the container refrigeration apparatus comprising:
a gas supply device including at least one adsorption column provided with an adsorbent for absorbing nitrogen in air, a first pumping mechanism supplying pressurized outside air to the at least one adsorption column, and a second pumping mechanism sucking air from the at least one adsorption column to produce nitrogen-enriched air having a higher nitrogen concentration than outside air and supplying the nitrogen-enriched air to the interior of the container via a supply passage;
an oxygen concentration sensor which measures an oxygen concentration of the air in the container;
a controller which controls the operation of the gas supply device so that the oxygen concentration measured by the oxygen concentration sensor reaches a target concentration;
a measurement passage which guides part of the nitrogen-enriched air passing through the supply passage to the oxygen concentration sensor so that the oxygen concentration sensor measures the oxygen concentration of the nitrogen-enriched air;
an on-off valve provided for the measurement passage,
the container houses a fan producing an air flow that passes the evaporator and circulates in the container, and an air passage having a one end opened on a blowout side of the fan and the other end opened on a suction side of the fan so that the air in the container flows from the one end to the other end of the air passage as the fan rotates,
the oxygen concentration sensor is provided for the air passage to measure the oxygen concentration of the air passing through the air passage,
the measurement passage is comprised of a branch pipe which connects the supply passage and the air passage, the branch pipe diverging, and guiding to the air passage, part of the nitrogen-enriched air passing through the supply passage, and
the controller is configured to perform, while the gas supply device is in operation and a rotation of the fan is stopped, a supply air measurement operation in which the on-off valve is opened and the oxygen concentration sensor is allowed to measure the oxygen concentration of the nitrogen-enriched air.

2. The container refrigeration apparatus of claim 1, further comprising:
a connection joint; and
an introduction pipe, one end of which is connected to the connection joint,
wherein the other end of the introduction pipe is configured to introduce a calibration gas, which is supplied via an external supply pipe connected to the connection joint and is for use in calibration of the oxygen concentration sensor, into the measurement passage to be closer to the oxygen concentration sensor than the on-off valve.

3. The container refrigeration apparatus of claim 1, wherein
the evaporator is provided on the blowout side of the fan,
the container refrigeration apparatus further comprises a unit controller which performs a cooling operation in which the fan is rotated and the refrigerant is circulated in the refrigerant circuit so that the air in the container is cooled in the evaporator through heat exchange with the refrigerant, and a defrosting operation in which the evaporator is defrosted by heating the evaporator with the rotation of the fan stopped, and the controller is configured to perform, while the unit controller is performing the defrosting operation, the supply air measurement operation in which the on-off valve is opened and the oxygen concentration sensor is allowed to measure the oxygen concentration of the nitrogen-enriched air.

* * * * *